United States Patent [19]

Frieder et al.

[11] Patent Number: 4,527,237
[45] Date of Patent: Jul. 2, 1985

[54] DATA PROCESSING SYSTEM

[75] Inventors: Gideon Frieder, Williamsville; David T. Hughes, Amherst; Mark H. Kline; John T. Liebel, Jr., both of Williamsville; David P. Meier, Orchard Park; Edward A. Wolff, Tonawanda, all of N.Y.

[73] Assignee: Nanodata Computer Corporation, Buffalo, N.Y.

[21] Appl. No.: 483,444

[22] Filed: Apr. 14, 1983

Related U.S. Application Data

[63] Continuation of Ser. No. 83,677, Oct. 11, 1979, abandoned.

[51] Int. Cl.³ ............................................. G06F 13/00
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 4,096,567 | 6/1978 | Millard et al. | 364/200 |
| 4,130,865 | 12/1978 | Heart et al. | 364/200 |
| 4,205,373 | 5/1980 | Shah et al. | 364/200 |
| 4,228,496 | 10/1980 | Katzman et al. | 364/200 |
| 4,253,146 | 2/1981 | Bellamy et al. | 364/200 |
| 4,325,120 | 4/1982 | Colley et al. | 364/200 |
| 4,354,225 | 10/1982 | Frieder et al. | 364/200 |

OTHER PUBLICATIONS

Pluribus–An Operational–Fault Tolerant Multiprocessor, Proceedings IEEE, Oct., 1978, by Katsuki et al.

Primary Examiner—Raulfe B. Zache
Assistant Examiner—John G. Mills
Attorney, Agent, or Firm—Christel, Bean & Linihan

[57] ABSTRACT

A data processing system comprising an active and intelligent main store including a main memory, a main store controller for accessing the main memory in a manner allowing different address and data structures, and a main store bus connected to the controller. At least one processor of a first type is connected to the main store bus, this being an auxiliary processor for performing input-output and other operations. At least one processor of a second type also is connected to the main store bus, this being an execution processor for fetching, decoding and executing instructions. All or some of either or both of the auxiliary processors and execution processors may be different. A supervisory processor for initiating configuring and monitoring the system is connected to the main store bus. A communication bus is connected to the processors of the first and second types and to the supervisory processor. A diagnostic bus connects the supervisory processor to each of the processors of the first and second types. An input-output bus ensemble is connected to the supervisory processor and to each auxiliary processor. At least one device and associated device controller can be connected to the input-output bus ensemble. At least one direct memory access controller can be connected between the main store bus and the input-output bus ensemble.

19 Claims, 15 Drawing Figures

DATA PROCESSING SYSTEM

This application is a continuation of application Ser. No. 83,677, filed Oct. 11, 1979, now abandoned.

BACKGROUND OF THE INVENTION

This invention relates to digested data processing systems, and more particularly to a new and improved multiprocessor arrangement.

Currently available data processing systems can be divided roughly into two categories; Those which support a single, selected instruction set and those which by design support multiple instruction sets. The latter category includes machines which have two or more sets of microcode sequences, sometimes supported by special hardware features, to implement predefined instruction sets. Both categories can be of the single processor or multiprocessor variety. In the case of multiprocessors, it has been customary to provide only one architecture of processors for the support of the user instruction set. Whenever applicable, prior systems have distributed operating system functions and support over some number of processors, all of which have used the memory system as a passive element.

SUMMARY OF THE INVENTION

It is therefore, a primary object of this invention to provide a new and improved digital data processing system.

It is a further object of this invention to provide a new and improved data processing system of the multiprocessor type.

It is a further object of this invention to provide a multiprocessor arrangement where all or some of the processors may be different not only in design but also in the user instructions that the processors support.

It is a further object of this invention to provide such a multiprocessor arrangement having the capability to accommodate additional processors in the future having diverse instructions sets not necessarily originally contemplated.

It is a further object of this invention to provide communications, diagnostic and supervisory support for such diverse multiprocessors arrangement.

It is a further object of this invention to provide a data processing system having an active, intelligent main memory system to support diverse memory structures.

It is a further object of the present invention to provide a data processing system in which functions which had been done by the processor or processors, will be subsumed in the memory system, thus providing essentially the capability of an active and intelligent memory system which provides parallel, diverse memory management functions independently of the operation of the processors.

It is a further object of the present invention to provide such a memory system which allows for addition of memory structure subsequent to manufacture and installation of the data processing system of which it is a part.

It is a further object of the present invention to provide such a memory system which enables processors to share in overlapped, shared or exclusive fashion thereby enabling each processor to access the same information in potentially diverse form.

It is a further object of the present invention to provide such a multiprocessor arrangement enabling pooling of processor groups and providing all connection, data access, control, monitoring and diagnostic capabilities to support such pooling.

It is a further object of the present invention to provide a heterogeneous, modular and expandable data processing system in which expansion is accomplished by properly added hardware modules and where the total system operation is under the supervision of a special diagnostic processor which has its own dedicated diagnostic bus.

It is a further object of the present invention to provide a data processing system having input-output facilities and controls which enhance the degree of parallelism between data transfers while allowing well defined but potentially diverse loci of control in the form of auxiliary processors.

It is a further object of the present invention to provide a data processing system having such input-output facilities in a manner that allows both shared and exclusive access to peripheral devices by diverse input-output protocols and data structures, and wherein potentially diverse procedures can proceed in parallel even if controlled by a single locus of control.

It is a further object of the present invention to provide a data processing system having diverse, parallel processing capabilities which can perform diverse processing of input-output structures independently and parallel to the processing of the potentially diverse user instruction sets.

The present invention provides a data processing system comprising a plurality of tightly coupled processors which are connected together in the system in a manner such that any processor can communicate with any other processor in order to transfer control information and data associated with the control information through the system. The processors can be of three categories, two of which can include a plurality of processors, and the processors are connected together in a manner such that the processors of the two categories are capable of being different. The system further comprises an active intelligent main store including main memory means, main memory control means operatively connected to the main memory means for accessing the main memory means in a manner allowing different address and data structures, and main store bus means for connecting the processors to the intelligent main store enabling the processors to share the memory.

The processors of one of the afore-mentioned two categories are auxiliary processors for performing input-output and other operations, and the processors of the other of the categories are execution processors for fetching, decoding and executing instructions. The third category of processors can include a supervisory processor for initiating, configuring and monitoring the system, and this processor also is connected to the main store bus means. A communication bus means is connected to all of the processors, and a diagnostic bus means connects the supervisory processor to each of the auxiliary processors and execution processors and to the main store. An input-output bus ensemble is connected to the supervisory processor and to each auxiliary processor. At least one device and associated device controller can be connected to the input-output bus ensemble. At least one direct memory access controller can be connected between the main store bus means and the input-output bus ensemble.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Brief System Description

Figure 1:
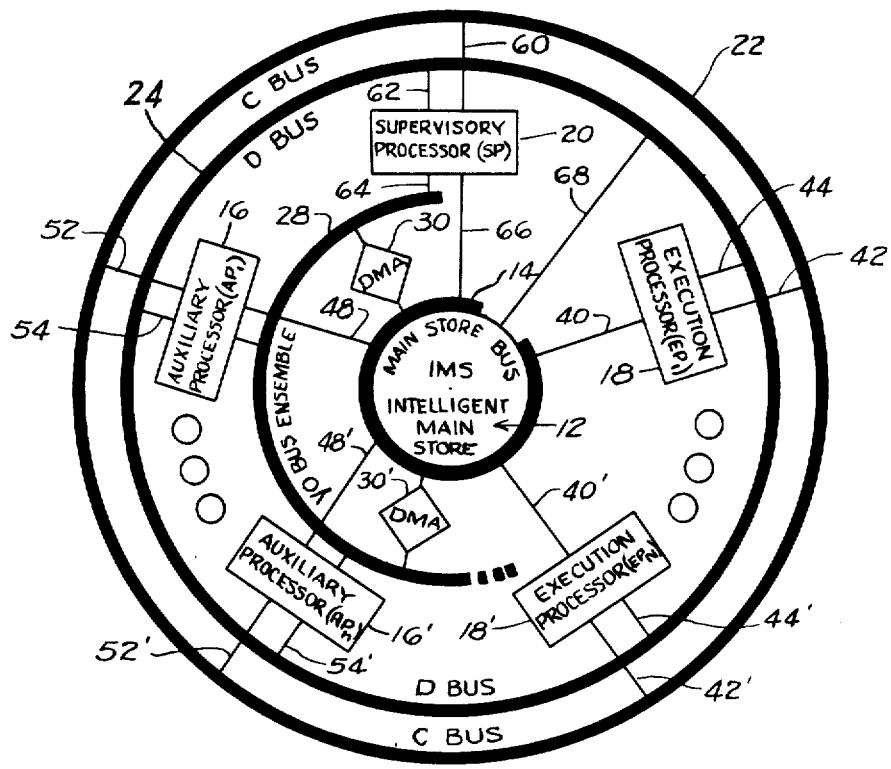
FIG. 1 is a schematic block diagram of a digital data processing system according to the present invention.

The data processing system of the present invention is illustrated in FIG. 1 and is organized around an intelligent main memory subsystem including an intelligent main store generally designated 12 and a main storage bus means 14 operatively associated with the intelligent main store in a manner which will be described. The system further comprises a plurality of tightly-coupled processors, and the processors are of three categories. The term tightly coupled as used herein is intended to include processors which apart from any memory they may have all share a common memory space and have the ability to communicate with each other at high speed and send an interrupt signal at any point in time. In the system shown, two of the categories each includes a plurality of processors. As illustrated in FIG. 1, one of the categories of processors are identified as auxiliary processors designated 16 and 16'. Another category is identified as execution processors designated 18 and 18'. For convenience in illustration, only two auxiliary processors 16,16' and only two execution processors 18,18' are shown, but a smaller or larger number of processors can be included in the system of the present invention. The third category of processors is a supervisory processor designated 20. The nature and operation of the processors will be described in detail presently.

The system of FIG. 1 further comprises means in the form of a communication bus generally designated 22 for connecting the processors together in the system in a manner such that any processor can communicate with any other processor in order to transfer control information and data associated with the control information through the system. As will be explained in further detail presently, the communication bus 22 connects the processors in a manner such that the processors of the two categories are capable of being different. In other words, auxiliary processors 16 and 16' are capable of being different from one another, and execution processors 18 and 18' are capable of being different from one another. A diagnostic bus means 24 is provided for connecting the supervisory processor 20 to all of the other processors in the system, as well as to the main store system.

The data processing system of the present invention further comprises a bus arrangement 28 comprising a plurality of additional buses also defined as an input-output bus ensemble. The processors of one of the categories, in particular the auxiliary processors 16 and 16', are connected in controlling relation to the bus arrangement 28. As shown in FIG. 1, the supervisory processor 20 also is connected in controlling relation to the bus arrangement 28. At least one device and associated device controller (not shown in FIG. 1) are operatively connected to ensemble 28.

The system of the present invention may include some number of direct memory access controllers, and in the system shown in FIG. 1 there are two direct memory access controllers designated 30 and 30'. Each direct memory access controller is connected to the main storage bus means 14 and to the input-output bus ensemble 28.

Figure 2:
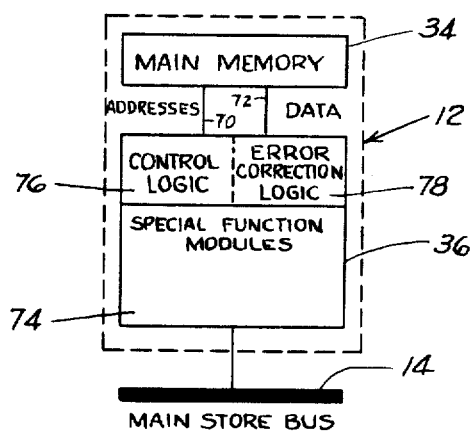
FIG. 2 is a schematic block diagram of the intelligent main store of the system of FIG. 1.

Referring now to FIG. 2, the intelligent main store 12, which is characterized by high speed and flexibility, comprises a main memory 34 and a main store controller generally designated 36. The main store controller 36 provides access to the main memory 34 for all units of the system, i.e. it serves as an interface between the main memory 34 and all units such as processors of the system. The main store controller 36 supports virtual memory translation and protection and controls parallel requests of the memory from the various processors in the system. The main store controller includes a modular, hard-wired unit which drives a very high speed control memory (not shown in FIG. 2) which can be used for scratch pad, flag and other control information storage. This same hard-wired unit also drives the main memory 34 which may be viewed as being of moderate speed and relatively large size. The main store controller presents to the rest of the system a speed and structure independent way of utilizing the main memory 34. Since the system of the present invention is designed to support multiple virtual machines, it is desired that the memory structure be as general as possible. However, generality can be expensive and slow. Accordingly, as a balance, the main store controller 36 supports various memory structures through high speed control modules. The function or control modules provide, for example, base and field length registers, virtual memory control, memory protect schemes and data remapping schemes. The modules are selected by bits on the memory bus 14 in a manner which will be described. This not only provides a choice of functions but it also provides the system with the capability to implement a rather general microprogrammed control to provide such functions. The main store controller 36 generates timing, controls refresh, decodes addresses, and buffers data lines. It also provides base register addition, priority arbitration, error correction/detection, address and data traps, address out of range detection, memory bus data parity generation, memory bus address and data parity verification, and other functions as necessary and as defined by the various function modules.

The main store bus 14 is bidirectional in nature and supplies and receives address and data information and control bits associated therewith. Although the system shown includes one bus 14, the system has the capability to accommodate additional main store buses. The exact information which is present on a given main store bus signal line is defined by the selected function module and by the processor which is enabled to the main store bus at that instant in time. The nature and operation of the control or function modules of the main store controller 36 will be described in detail presently.

The system of the present invention may include at least one execution processor 18 which provides the system with high speed execution of a chosen instruction set. The nature of the present invention allows for a configuration containing as little as one auxiliary processor and one supervisory processor with the main store 12 and all four buses. However, including the execution processor provides efficient emulation. In particular, the execution processor performs the instruction set of a target machine being emulated. The system of the present invention can include a plurality of execution processors 18, which maybe all different, all identical or a mixture thereof. In any event, one or more execution processors may be included in the system and serve to fetch, decode and execute instructions. Thus each execution processor 18 also may be viewed as a central processing unit. The execution processor 18 is a combination hard wired and microcoded device. The design objectives of the execution processor are to optimize the execution speed of a limited instruction set.

It should be clear that the data processing system of the present invention has the capability of providing a rather general execution processor which will emulate any one of a given list of machines. The preferred approach, however, is to provide a number of dedicated execution processors that will provide the performance and the target machines that are most useful for the system users. For example, in an illustrative system, the execution processor 18 can be designed to emulate an IBM 370 machine with the execution speed exceeding that of a model 148. The execution processor, in this illustrative case, provides overlap capabilities and, at each point in time, there are multiple instructions in various stages of execution.

For convenience in illustration, only two execution processors 18 and 18' are shown in FIG. 1 but the system can include a larger number of execution processors if desired. Each execution processor is connected to the main store bus 14 and to the communication and diagnostic buses 22 and 24, respectively. In particular, processor 18 is connected through path 40 to main store bus 14 and through paths 42 and 44 to the communication bus 22 and diagnostic bus 24, respectively. Similarly, processor 18' is connected through path 40' to main store bus 14 and through paths 42' and 44' to the busses 22 and 24, respectively.

The auxiliary processor 16 may be viewed as a microprogrammable processor having a changeable instruction set. While the execution processor 18 provides execution of a selected instruction set, the auxiliary processor 16 supplies all additional services such as system support, input-output processing, and special instructions support. The auxiliary processor 16 permits implementation in microcode of such things as communication subsystems and file management subsystems. Thus, the auxiliary processor 16 performs input-output operations, automatic input-output error checking and recovery, and performs other systems tasks that may have been programmed by the user or provided by the manufacturer.

An illustrative auxiliary processor 16 has up to 120 kilo bytes of internal memory which is independent of all other memories in the system. The auxiliary processor 16 operates at sub-microsecond instruction speeds, is preprogrammed and provides hardware support of concurrent task execution, automatic status save/restore operations, firmware tasks scheduling, and includes an arbitrary number of register sets limited only by tle number of resident tasks and available memory.

Each auxiliary processor can be built, for example, of microprogrammable bit slices and the instruction set for each auxiliary processor is defined by a horizontal code designated nanocode for the bit slices which construct the machine. For each application class of the auxiliary processor there is a special nanocode set which implements the proper instruction set. All instruction sets, however, share a common architectural concept: that is, an interrupt driven, self-virtualizable architecture with nanocode scheduling of tasks, location independent code, and variable number of registers which can also be addressed as memory.

The auxiliary processor 16 performs input-output emulation of two types: channel emulation and device emulation. Channel emulation involves for example processing of input-output instruction, fetching and decoding channel command words, storing channel status words and sending commands to device controllers. The auxiliary processor instruction set which is used for channel emulation basically involves memory to memory and control operations. Pseudo memory locations are assigned to the external resources: the main store bus data, address and control lines, the input-output data, address and control registers and the communication bus 22. All these registers and controls are of various lengths and are manipulated by special instructions. These instructions and the psuedo memory locations for resources simplify and considerably speed up the input-output driving provided by the auxiliary processor. Device emulation, also performed by the auxiliary processor, involves mapping commands of the device being emulated into the proper format for the physical device and mapping status information from the device into a proper format for the execution processor. It also involves mapping the data formats assumed by the execution processor into the possibly different data formats of the physical device.

The auxiliary processor 16 serves as part of the input-output portion or subsystem of the data processing system, and thus serves to provide a high degree of flexibility, performance, expandability and reliability.

The input-output subsystem includes, along with the auxiliary processor 16 or a number thereof, one or more of the direct memory access controllers 30 and high speed data channels associated therewith and one or more busses of the input-output bus ensemble 28 each connected to a large number of device controllers. When the auxiliary processor serves as a channel emulator it is connected to the input-output busses. On these input-output busses there are two types of devices, (not shown in FIG. 1). The first are high speed type devices such as discs and tapes and these are connected through their respective device controllers to the input-output bus ensemble 28 and to a port of a direct memory access controller 30. The second type are low speed devices which are connected through their respective device controllers to an input-output bus alone.

With respect to the high speed devices, the actual control of the information transfer to or from the main store is done via the direct memory access controller 30. This control is initiated, monitored and terminated by the auxiliary processor 16 via the input-output bus connection to the direct memory access controller 30 and to the device itself. The auxiliary processor 16 sends control information and receives status information from the device controller. If desired, a high speed device can be operated in the system without a direct memory access controller 30. In this case, the direct memory access junction is provided by the auxiliary processor. The actual transfer of data, using control provided by the direct memory access controller 30, does not load the auxiliary processor 16 thus freeing it for other tasks. The hardware of the direct memory access controller 30 has access priority to the main store bus 14 over any auxiliary processor 16 or execution processor 18, and it shares the main store bus 14 in a priority protocol with other direct memory access controllers.

The slow speed devices are controlled directly by the auxiliary processor 16. The data transfer is done by reading or writing an input-output register one byte at a time. All data packing, unpacking and conversions which are not done by the device controller are done by the auxiliary processor 16. Considerable memory bus load reduction can be achieved with the relatively wide main store bus 14.

Thus, the auxiliary processor 16 serves as an intelligent channel controller, supervising operation of the direct memory access controllers 30 and the device controllers. The auxiliary processors, direct memory access controllers, and device controllers in the system are all capable of being programmably switched from one bus to another. Multiple auxiliary processors, direct memory access controllers and busses provide a high degree of redunancy, usually allowing the system to continue operation if one or more of these components fails. Thus, the auxiliary processor, in addition or as part of performing input-output emulation, performs input-output bus, direct memory access controller and device controller management. Such management functions include handling input-output bus status and data interrupts, transferring commands and data over the input-output bus, setting up proper parameters in the direct memory access controller, co-ordinating interaction between device controller and direct memory access controller, and participating in low level device control where necessary.

For convenience in illustration, two auxiliary processors 16 and 16' are shown in FIG. 1 but a different number can be provided, for example up to about fourteen in a single system. Each auxiliary processor is connected to the main store bus 14, to the communication and diagnostic busses 22 and 24, respectively, and to the input-output bus ensemble 28. In particular, auxiliary processor 16 is connected by path 48 to the main store bus 14, by path 50 to the input-output ensemble 28, by path 52 to the communication bus 22, and by path 54 to the diagnostic bus 24. Similarly, processor 16' is connected through path 48' to the main store bus 14, through path 50' to the input-output bus ensemble 28, through path 52' to the communication bus 22, and through path 54' to the diagnostic bus 24.

The supervisory processor 20 initiates, configures, and monitors the data processing system. The supervisory processor 20 has access to all regular system components for overall control of the system. For maintenance and reliability considerations, the supervisory processor is connected to its own diagnostic bus, i.e. the diagnostic bus 24, which in turn is connected to all other parts of the system i.e. to the auxiliary processors 16, the execution processors 18 and the intelligent main store 12. The supervisory processor 20 and diagnostic bus 24 thus provide the basis for system-wide control and diagnostic capability. In addition, the supervisory processor 20 interfaces to the communications bus 22, the main store bus 14, and the input-output bus ensemble 28 to simulate the operation of the other system processors. In particular, supervisory processor 20 is connected by path 60 to communication bus 22, by path 62 to the diagnostic bus 24, and by path 64 to the input-output bus ensemble 28. The supervisory processor also is connected by path 66 to the main store bus 14. The diagnostic bus 24 is connected by a path 68 to the main store bus 14.

The supervisory processor 20 constantly monitors all system resources, responds to operation requests, and initiates automatic recovery if necessary. In particular, the supervisory processor 20 is responsible for initializing the system, i.e. loading writable control memories, partitioning the main memory and allocating the auxiliary processors 16 to various tasks. The supervisory processor also monitors operation of the system, logging errors as they occur and performing appropriate error recovery procedures when necessary. The supervisory processor also performs tasks of a system console, such as reading, displaying and changing memories and registers, starting and stopping processors and breakpoints, to mention a few. The supervisory processor contains a remote interface connection which allows diagnosis and updating of the system microcode. Furthermore, the supervisory processor serves as both a local and a remote diagnostic tool, being capable of diagnosing memories, busses, processors, input-output channels and peripherals.

The speed and performance of the supervisory processor 20 has the least impact on the system as it is actually not necessary during normal operation of the system. The supervisory processor is employed for user and operator interface, machine status display, as a diagnostic tool for microprograms, for diagnosis of faults in all units including input-output devices and as a very advanced controller for remote diagnosis. When the system is in actual operation, the supervisory processor provides operator interface and integrity control. Upon any occurence of hardware failure, the supervisory processor initiates and controls soft and firm recovery procedures.

The supervisory processor 20 is connected by the diagnostic bus 24 to the auxiliary processor 16 and to the execution processor 18, and it is connected also to the input-output ensemble 28. In the connection to the auxiliary processors 16 and to the input-output bus ensemble 28, the supervisory processor 20 can serve in a dual role. It can appear as an input-output device for the auxiliary processor 16 thus simulating an arbitrary device, or it can appear as an auxiliary processor 16 as far as the devices are concerned. This dual role is extremely important for diagnostic purposes. The connection of the supervisory processor 20 through the diagnostic bus 24 to the execution processors 18 is used for single stepping, for invocation of diagnostic microcode procedures, for loading and reading of internal registers and flags, and for various system measurement functions.

The software of the supervisory processor 20 is based on two different considerations. The first is reliability, availability and servicability support for the hardware and firmware. The second is the creation of the user interface and user indicators for the machines which are emulated by the particular execution processors currently incorporated in the system.

In the data processing system of the present invention there are four bus groups: the main store bus 14, the communication and control bus 22, the diagnostic bus 24 and the input-output bus ensemble 28. The memory bus or main store bus 14 already has been described in connection with the intelligent main store 12. The communication and control bus 22 is not really a bus but a storage device which can be read and written by each of the units connected to it, i.e. by each of the auxiliary processors 16, execution processors 18 and by the supervisory processor 20. Some of the bits in the communication and control bus 22 are hardwired to control signals in the various processors. The connections are controlled strictly by convention and design. The communication and control bus 22 allows communication between execution processors 18 for networking purposes, between auxiliary processors 16 for load sharing and between execution processors 18 and auxiliary processors 16 for input-output initiation, input-output status interrupts, input-output status interrogation, assignment of tasks and synchronization. The communication and control bus 22 is parity protected, as are all other busses.

The diagnostic bus 24 provides a path for the supervisory processor to interrogate all the functional units in the system, and the supervisory processor has complete control over this bus. The diagnostic bus 24 is used to read and write the auxiliary processors 16, to control devices, to initiate interrupts, to load and control registers in all input-output devices, and for execution processor dependent diagnostic functions. The diagnostic bus provides a path for loading control memories, for reading registers, memories and machine state, for servicing error conditions which the various functional units are not handling themselves, and for running diagnostics on various busses and functional units. The diagnostic bus 24 usually is not active during normal system operations, although it can be excerised for such operations as "spying" on the system, performance analysis, etc.

The input-output bus ensemble 28 of the system illustrated in FIG. 1 is built from four input-output busses. Each input-output bus is capable of transmitting both data and control information. Each device controller in the system has to be connected to one of the input-output busses and optionally can be connected to any number of them. The input-output bus ensemble 28 is used for transfer of control information for both low speed and high speed devices and for transmission of low speed data. Low speed is defined as rates of up to 300 kilobytes per second on a continuous basis or speeds of up to two million bytes per second in bursts which do not exceed 8 kilobytes and which are infrequent enough not to saturate the capability of the auxiliary processors which are connected to that bus. High speed input-output operation is divided into two categories, up to five million bytes per second and from five to sixteen million bytes per second, but data flowing at these data rates are not handled via the input-output bus ensemble as will be explained presently.

In operation, the inherent simplicity of the system architecture coupled with the built-in emulating power permits a rather clean procedure for the emulation of any real machine on the system of the present invention. Assume that a machine is chosen as a target for emulation. The input-output part, including communication protocol, interrupt conventions, and parallelism of the chosen machine are analyzed and implemented in microcode for the auxiliary processor 16. This microcode is vertical and easy to implement. Additional necessary instructions can be added via a horizontal code known as nanocode. The hardware characteristics of the direct memory access controllers 30 and the high speed operation of the auxiliary processor 16 permits efficient handling of high speed devices, and the high speed and width of the main store bus 14 permits simultaneous operation of many high speed devices. In parallel to the implementation of the microcode, the dedicated bits of the auxiliary processor 16 in the communication bus 22 are assigned fixed functions. These bits will serve for communication between the auxiliary processor 16 and the execution processor 18. Also, the code necessary for the supervisory processor 20 is developed in parallel, as is the execution processors 18 for the chosen machine. In particular, the system user must write or acquire programs written in the instruction set performed by the execution processor 18.

When the system is initiated, all the power of a parallel distributed host framework is unleashed. In particular, the following are done in completely controlled, parallel operation: One or more execution processors 18 fetch, decode and execute instructions. One or more auxiliary processors 16 perform input-output operations, automatic input-output checking and recovery. In addition, each auxiliary processor 16 performs other system tasks that may have been programmed by the user or provided by the manufacturer. The intelligent main store 12 supports virtual memory translation and protection, and it controls parallel memory requests from the auxiliary processor 16 and from the execution processor 18. The supervisory processor 20 constantly monitors the system resources, responds to operation requests, and if necessary initiates automatic recovery.

Thus, all the system components operate in complete parallelism. The input-output is usually performed in parallel, and if the instruction is looping until input-output completion, completion is signalled via the communication bus 22. When instructions are executed by the execution processor 18, if the instructions signal input-output or there is any need of service by the auxiliary processor 16, the auxiliary processor 16 is notified via the communication bus 22 causing an interrupt condition. If no auxiliary processor service is necessary, the instruction is executed by the execution processor 18.

Before the next instruction fetch, the communication bus 22 is interrogated for a signal from an auxiliary processor 16. Only one bit has to be interrogated, and depending upon the design of the execution processor 18, it invokes either no overhead or one microinstruction. At any time, the supervisory processor 20 can stop or alter the processing in all execution processors 18 and auxiliary processors 16.

In addition to the parallelism between an execution processor 18 and an auxiliary processor 16 which serves it, there can be a built-in parallelism in the execution processor itself, for example between the fetch and execute cycles. There also can be parallelism between the auxiliary processors themselves and between the various execution processors. The system of the present invention has the flexibility to allow variations in the actual degree of parallelism implemented in each particular system and for each target machine.

The arrangement of internal busses allows the execution processors 18 and auxiliary processor 16 in the system to form a network of processors. The execution processor 18 sends input-output commands, etc. to the auxiliary processors 16 while the auxiliary processors return status information. This arrangement is also used for transferring interprocessor commands in multiple processor configurations and allows the transfer of interprocessor control information.

The communication protocol implemented accepts messages from the processors and automatically insures that each message reaches the proper destination. If the destination processor is busy, the system will give other processors time to send messages and then will try to deliver the message again. The communication system works autonomously and does not require that either the sending or receiving processor be occupied with the details of the transfer.

The system of the present invention, accordingly, is a universal host for virtual machines. By way of further example, when the system is used to emulate an IBM 370 machine, the auxiliary processor 16 is a 16 bit sub-microsecond, register to register, memory to register and memory to memory architecture wherein each task has its own register set. In the IBM 370 emulation, the auxiliary processor 16 is called by an execution processor 18 each time the latter encounters an input-output instruction and each time a microcoded operating system support feature is requested. The auxiliary processors16 are programmed to perform complete channel command word processing, all input output driving, device error recovery, all retry and data overrun processing, channel command word prefetched if allowed, etc. The operating system which is running on the execution processor 18 is spared all routine retries reducing considerably the system overhead. The particular structure of the execution processor 18 for emulation of an IBM 370 machine will be described in further detail presently.

The system of the present invention advantageoulsy has the capability of including multiple execution processors 18 and multiple auxiliary processors 16. This allows different execution processors or central processing units to share the system resources of main store, auxiliary processors and peripherals, and it allows execution processors to work together in networks, as front end processors or as independent central processing units. This capability also allows addition of auxiliary processors to handle heavy input-output loads, to emulate some computer systems without the need for execution processors, and for data preprocessing and data routing. It also allows greater system reliability with back-up auxiliary and execution processors and permitting an auxiliary or execution processor to be serviced while others are running.

In the system of the present invention, each of the two categories of processors, i.e. auxiliary processors 16 and execution processors 18, is capable of using the other of the two categories as a pool. For example, an execution processor 18 while requesting an auxiliary processor service via the communications bus 22 can direct that request to a group of auxiliary processors 16 rather than to a particular auxiliary processor. The service granted will be at the discretion of the group of auxiliary processors 16 rather than at the discretion of the requesting execution processor 18. As the service request includes the identification of the requesting execution processor 18, there is no problem encountered in the reply to the request by the auxiliary processor which will eventually honor the request. The foregoing procedure can be performed in the opposite direction, i.e. an auxiliary processor 16 requesting execution processor service. In addition, if desired one processor of a group or category can utilize the others of that same category as a pool. In this connection, the communication bus 22 message contains, among others 4 source identification bits and 4 destination identification bits. Each processor can be set up to recognize one or more of these destination identifications, one of these being that processor's own identification bit and the other bits being a pool identification.

Detailed System Description

The intelligent main store 12, as shown in FIG. 2 includes a main memory 34 which is built from interchangable modules whereby addresses can be reassigned without changes in the physical memory. It comprises 72 bit data words and 8 error correction bits providing standard single bit error correction, and double bit error detection. The main memory 34 receives 27 bit wide addresses along path 70 from the main store controller 36. Data travels along path 72 between main memory 34 and the main store controller 36. The main store bus 14 accomodates 104 data/address lines, which are typically divided into 72 data lines, 32 address lines, and 41 control and parity lines. It allows easy change in the total data width (which can be between 1 and 72 bits) and in the total address width (which can be between 1 and 104 bits if the address/data is time multiplexed, or between 32 to 96 bits if the data and address are sent at the same time). Actual implementation of the bus is dependent on the mumber of parallel requests that can be handled by the memory controller 36. For example, in a machine where only one memory request is handled at one time, the physical implementation is a single bus with priority selection capable of transferring one datum and one address each 500 nanoseconds, i.e. one 72 bit unit every 500 nanoseconds thereby achieving a data rate of better than 16 million bytes per second. By way of further example, in the emulation of an IBM 370 machine, of the total of 104 address/data bits of the bus 14, 64 of the data bits and 24 of the address bits are used in parallel.

As shown in FIG. 2, the main store controller 36 is arranged into three portions, one portion 74 containing the special function or control modules, a second portion 76 containing control logic, and a third portion 78 containing error correction logic. The function or control modules enable the main store controller 36 to support various protection schemes, virtual memory schemes, dynamic address translation schemes and address/packing methods. The main store controller 36 can map addresses to any place in the main memory 34, and it also serves to control parallel memory requests from other system processors. In an exemplary system as illustrated in FIG. 2, where there are concurrent special separate control modules, each providing virtual memory control, memory protection, memory relocation base registers, and data mapping, the desired control module is selected by bits on the main store bus 14. Although the physical residence of the control module is shown within the main store controller 36, it could be elsewhere in the system depending on such considerations as cost and performance. However, logically the functions of the controller modules are considered part of the memory system. There are typically up to four function or control modules in a system, one for each virtual machine type.

The objective of generality with low cost is achieved by including in the system configuration of the main store controller 36 only those control or function modules which are required by the virtual architecture which the system user desires. For example, the function units or modules designed for a machine emulating the IBM 370 machine accept 24 bit wide addresses and 64 bit wide data, although the memory bus 14 has a defined path width of 104 bits for data and address that can be used in any way that is desired.

There is no preferred organization of the main memory 34 external to the main store controller. In the present embodiment, main memory 34 is built from 72 bit words, plus eight error correction code bits for each word. The control or function modules within portion 74 are specially designed to map the required memory format into the internal memory format. The main store controller 36 issues 27 bit wide addresses to the memory, providing a maximum physical limit of more han 1 billion bytes, i.e. $2^{27}$ words of 8 bytes each. The main store controller accepts logical addresses up to 104 bits wide from the main store bus 14, and the currently active control module provides interpretation and mapping into 27 bit physical word address.

The intelligent main store 12 also has associated therewith a control memory (not shown in FIGS. 1 and 2) which enhances the capability to implement the various memory structures in the main store controller 36. The control memory, which will be described in detail presently, contains data patterns and control information which may change from one target machine architecture to another. It consists of up to 256 words each 72 bits wide. The actual logical width and length of the data present in the control memory depends upon the design and current selection of the appropriate control modules. By way of example, in the implementation.of an IBM 370 compatible machine, the control memory contains the control registers and the storage protection keys. The control memory also can store other pertinent information at the microprogrammer's choice. The sixteen general purpose registers and four floating point registers of the IBM 370 machine can also be stored in this control memory, although in the exemplary embodiment described herein they do not reside in the control memory.

Figure 3:
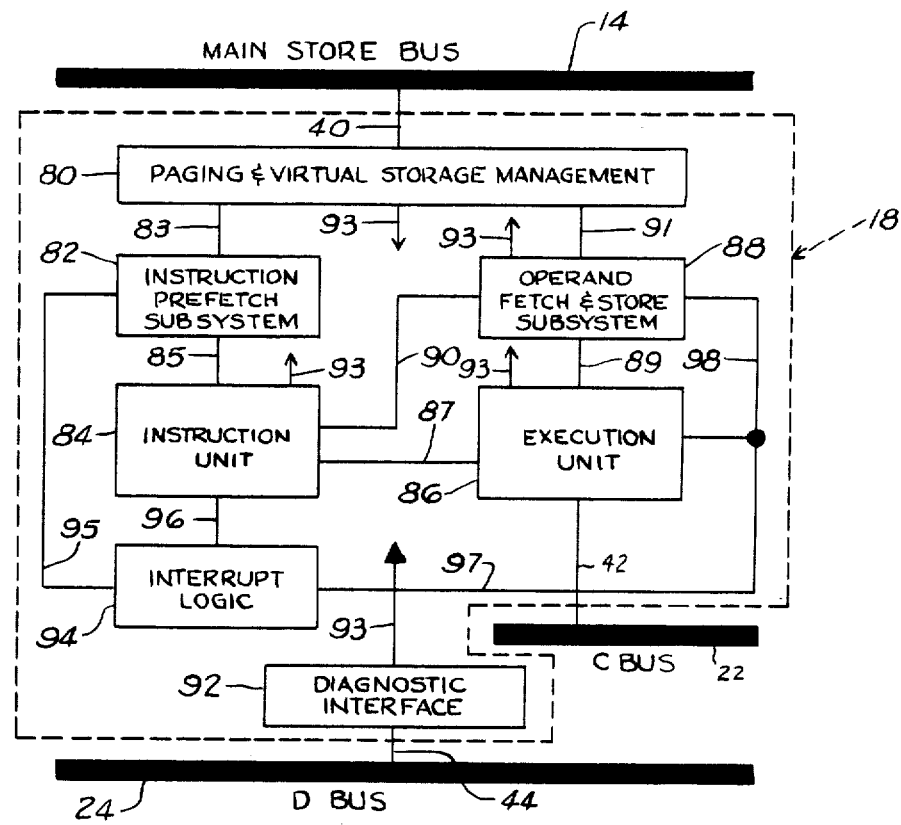
FIG. 3 is a schematic block diagram of an execution processor of the system of FIG. 1.

FIG. 3 shows in further detail the structure of an execution processor 18. The structure shown in FIG. 3 is for the situation when the system of the present invention emulates an IBM 370 machine. The structure of other execution processors used in the system for emulating other machines may be different. The execution processor 18 illustrated in FIG. 3 includes a number of parallel units. There is a memory interface unit 80, also designated a paging and virtual storage management unit, which is connected to the path 40 leading to the main store bus 14. There is an instruction prefetch unit 82 connected by a path 83 to the memory interface 80. An instruction preprocessing unit 84 is connected by a path 85 to the instruction prefetch unit 82. The execution processor 18 of FIG. 3 also includes an instruction execution unit 86 which is connected through a bus interface (not shown) and through the path 42 to the communication bus 22. The execution unit 86 is connected through a path 87 to the instruction unit 84. The execution processor 18 also includes an operand fetch and store subsystem designated 88. Unit 88 is connected through a path 89 to the execution unit 86, through a path 90 to the instruction unit 84, and through a path 91 to the memory interface 80. There is provided a diagnostic bus interface 92 which is connected through path 44 to the diagnostic bus 24 and which, in turn, is connected through a path 93 to all functional portions or subsections of the execution processor 18. The path to unit 82 is via unit 84. Finally, the execution processor 18 includes interrupt logic designated 94 and which is connected through a path 95 to the instruction prefetch subsystem 82, through a path 96 to the instruction unit 84, through a path 97 to the execution unit 86, and through a path 98 to the operand fetch and store system 88.

The memory interface 80 serves as a means for reserving the memory bus 14 in transferring information to and from the main store. It can include virtual memory support and virtual memory translation options, which belong logically to the main store controller 36. The memory interface 80 implements dynamic address translation supplemented with an 8 or 16 entry contents addressable memory using a modified least recently used replacement algorithm, provides translation with no access for operand pretesting requirements, performs load real address translation, provides address traps on instruction fetch, operand fetch and result store and can retry memory accesses up to 15 times on main store bus 14 parity error. In the exemplary system for emulating an IBM 370 machine, because of the way the virtual memory operates on the IBM 370 machine, the hardware support for this option can be placed physically in the execution processor 18 although it logically belongs to main store controller 36. The memory interface 80 also feeds the instruction prefetch 82 through the path 83.

The instruction prefetch unit 82 consists of two eight byte buffers. As instructions are processed from one of the buffers, the prefetch unit is operating constantly to fill the other one. Therefore, at least eight bytes of instructions are always available to the instruction unit 84, while eight bytes are being fetched. The only exception occurs during interrupts and during some of the system branch conditions. Thus, the instruction prefetch subsystem 84 prefetches instruction sequences, loads the 16 byte buffer 8 bytes at a time, loads the instruction register of unit 84 from the buffer and automatically attempts to keep itself filled. The instruction sequence is changed by loading a new address from the instruction unit 84.

The instruction unit 84 decodes the instruction, computes operand addresses, pretests storage operands for page accessibility through the operand fetch unit 88, and issues requests to the operand fetch unit 88 for preloading of operands and prefetching of operands from storage through unit 88. It also serves to fill the two buffers of the instruction prefetch unit 82. The instruction unit 84 is designed to assure that operands which are necessary for effective address computation or the operands which are needed by the instruction currently in the instruction unit 84 are not being changed by a previous operation being executed by the execution unit 86. The instruction unit 84 also detects most non-data specification errors, detects instruction modification when a result is sent to main storage, and detects general register modification of base and index registers used in address precalculation. It also transfers pertinent execution information to the execution unit 86 and initiates interruption program status words swapping routines as a function of interrupt logic. The instruction unit 84 also provides instruction traps, parity protection on instruction unit 84 to execution unit 86 transfer paths and word parity on a control store included in the unit which contains resident diagnostic routines.

The execution unit 86 accepts addresses, fetches operands, executes the previously decoded instruction, sets condition codes and stores the result. It executes the instruction whose microcode pointer was already prepared by the instruction unit 84. The operands for the instruction, if possible, have already been prefetched by the operand prefetch unit. After execution is completed the result is sent to the operand post store unit 88 through path 89. The execution unit 86 also issues a communication request to an appropriate auxiliary processor 16 whenever input-output instructions are encountered. Selection of the auxiliary processor 16 is based on address information supplied by the instruction unit 84. This information is used to address a small memory in the execution unit 86, i.e. a channel mapping memory, the output of which is the number of the auxiliary processors 16 that is the target of the communication message. In order to allow error recovery, soft-fail features and reconfigurability, this channel mapping memory can be reloaded at any time by the supervisory processor 20.

The execution unit 86 provides instruction execution with optimization on the set of instructions found to be the most important and widely used. It contains general purpose registers, floating point registers and a working store, and it also contains arithmetic, logic and shift elements necessary for instruction execution. The execution unit 86 contains byte handling circuitry, and it handles byte orientation of operands, detects the remainder of non-data specification errors, and detects data specification errors. It passes input-output instructions to auxiliary processors 16 over communication bus 22 and accepts input-output interruption and status information from auxiliary processors 16 over communications bus 22. The execution unit 86 provides byte parity protection on all data paths and registers of the unit, includes a control store which contains resident diagnostic routines, and provides word parity protection on that control store.

The instruction unit 84 and the execution unit 86 work in parallel. At each point in time, a minimum of two and a maximum of eight instructions are in an overlapped state of prefetching, decoding or execution. The operand post store unit 88 receives and deposits results from the execution unit along path 89 and causes eventual storage of that result in the main memory. The unit 88 can initiate a pretest request, i.e. translate with no access, of an address supplied by the instruction unit 84. All storage requests and multiple word operands are pretested if they cross a page boundary. The unit 88 also can initiate a prefetch request of an operand from an address supplied by the instruction unit 84. In this connection, all single operands are prefetched. The operand fetch and store unit 88 initiates a fetch request of an operand from an address supplied by the execution unit 86, and it initiates a store request of a result from address and data supplied by the execution unit 86. Storage of results is deferred until after the prefetch of the next operand unless both refer to the same double word.

The interrupt logic 94 collects interrupt requests, performs masking, generates a microprogram trap address to an appropriate interrupt handling routine in the instruction unit 84, and initiates instruction retry on error detected in the instruction unit 84 or execution unit 86.

The diagnostic interface 92 provides an interface from the diagnostic bus 24 to the interrupt logic 94, the instruction unit 84, the instruction prefetch subsystem 82, paging and virtual storage management 80, operand fetch and store subsystem 88 and the execution unit 86 via path 93. The diagnostic interface 92 has access to the control stores of the instruction unit 84 and execution unit 86, has access to the control store sequences, and has access to the other functional units of the execution processor. It provides micro-control and macro-control of execution processor 18, initiates address and instruction traps, and has capability of interrupting the supervisory processor 20 on execution processor 18 status changes, error conditions and state conditions.

The preferred embodiment of the auxiliary processor 16, as previously described, is built from microprogrammable bit slices. The word size is variable and in the case of the illustrative system for emulating IBM 370 services the word size is 16 bits, but it can be extended as described The auxiliary processor 16 has a speed independent design which enables it to fetch and execute instructions from a mixed speed control store. For example, one could envisage two components for the storage of the auxiliary processor 16 to consist of a very high speed memory, for example 75 nanoseconds, and a lower speed memory, for example 150 nanoseconds. The total memory of the current embodiment cannot exceed 120 kilobytes. The design thus facilitates the implementation of control programs in a way that has the effect of a cache without the need for complex and costly control. To this end one employs program measurement, memory allocation and locality of reference techniques. Optimization of this nature is possible as the number of programs to be executed in the auxiliary processor 16 is limited. An arbitrary number of registres is mapped on the high speed memory. The total number of registers that each task in the auxiliary processor 16 can use is limited to 256 but the total number of tasks is limnted only by the memory capacity which is 120 kilobytes. The auxiliary processor 16 also has a 72 bit wide main store interface.

As previously described, the data processing system includes four principal buses. The main store bus 14 has been described in detail previously. The communication bus 22 has a data width of 16 bits and 18 control and status lines are provided in addition to the data lines.

The diagnostic bus 24 has 8 bits of data, one parity bit and 9 control lines and each input-output within the input/output bus ensemble 28 has 9 data lines, one parity bit and 10 control lines.

The input-output system includes the auxiliary processor, input output bus ensemble, direct memory access controller, device controllers and associated devices. There are two basic modes of operation: byte mode which is either low speed or short high speed burst and high speed mode. In all modes, the control initiation and necessary intelligence is contained in the auxiliary processor 16. Actual data transfer is done by the auxiliary processor 16 in byte mode and by the direct memory access controller 30 in high speed mode. Each auxiliary processor can be connected, at any time, to two input-output buses. Each input-output bus can be connected to two different auxiliary processors. At each point in time there is only one live connection, i.e. at each point in time there is only one auxiliary processor 16 active for each input output bus. This means that a maximum of eight auxiliary processors 16 can be active, in parallel, at any given time in the system of the present invention. The auxiliary processor 16 recognizes only byte mode input-output. High speed mode input-output is handled by the direct memory access controllers 30, which, in turn, are loaded with control information by the auxiliary processor 16 operating in the byte burst mode. The input-output system provides unified input-output structure for all execution processors 18, allows execution processors 18 to share peripherals. has capability of sixteen 7Mega bit/second data paths to main store 12, has capability of eight 300 kilobit/second data paths to auxiliary processors, and has provision for complete redundancy of processors, busses and controllers.

There can be provided up to sixteen direct memory access controllers 30 in a system. Each DMA controller 30 has its own internal buffer memory to smooth out main store 12 requests, arranged as a 64 to 512 byte long FIFO queue, and byte packing logic which will be described in detail presently. Each DMA controller is connected directly to the main store bus 14 with a 72 bit wide main store interface and to up to four input-output busses. At each point in time, only one of these connections can be active, with the maximum transfer rate being 7 million bytes per second. Each DMA controller 30 is supervised by an auxiliary processor 16, manages high speed data paths from input-output controllers to main store 12, and can connect to multiple data paths, but only one at a time.

Figure 4:
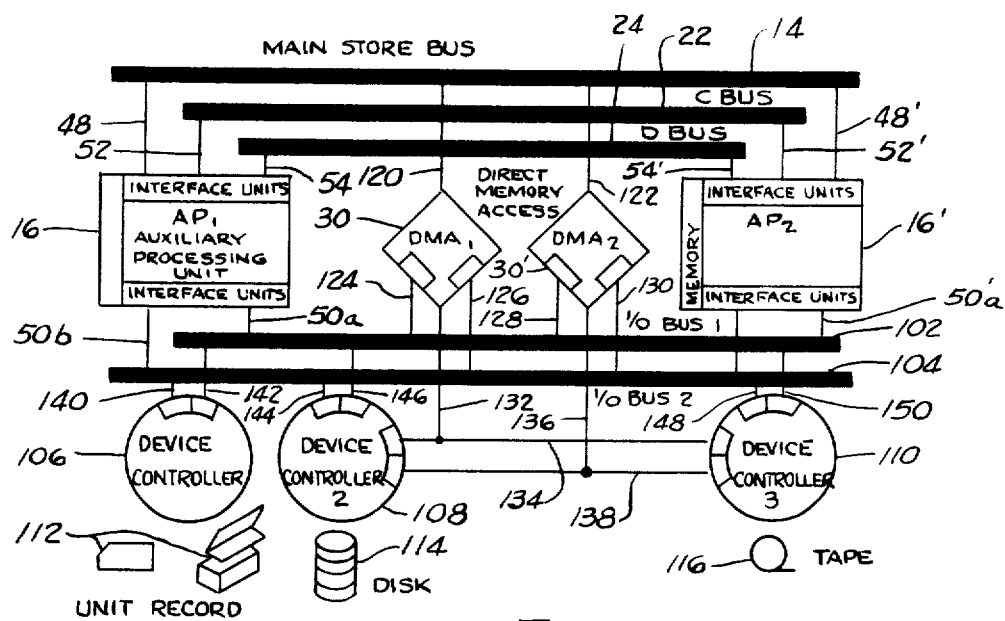
FIG. 4 is a schematic block diagram of a portion of the input-output subsystem of the system of FIG. 1.

FIG. 4 illustrates an example of input-output system connections using two auxiliary processors 16 and 16', two direct memory access controllers 30 and 30', two input-output busses 102 and 104 and three device controllers 106, 108 and 110. Two of the device controllers, in particular controllers 108 and 110, are connected to the direct memory access controllers 30. The device controller 106 is operatively associated with the unit record peripheral device 112, the device controller 108 is operatively associated with a disc type device 114, and the device controller 110 is operatively associated with a tape device 116. The connections of the auxiliary processors 16 and 16' to the main store bus 14, communication bus 22, and diagnostic bus 24 are identified with the same reference numerals of FIG. 1. For convenience in illustration, the connections between auxiliary processor 16 and the input-output busses 102 and 104, which comprise the input output bus ensemble, are identified 50a and 50b, respectively. Similarly, the connections of auxiliary processor 16' to the busses 102 and 104 are identified 50a' and 50b'. The direct memory access controllers 30 and 30' are connected by paths 120 and 12Z, respectively, to the main store bus 14. DMA controller 30 is connected by paths 124 and 126 to the input output busses 102 and 104 respectively. Similarly, DMA controller 30' is connected by paths 128 and 130 to the input output busses 102 and 104, respectively. DMA controller 30 is connected by paths 132 and 134 to the device controllers 108 and 110. DMA controller 30' is connected by the paths 136 and 138 to the device controllers 108 and 110.

The input-output system fulfills some desirable objectives such as relief or input-output computations and testing by the execution processors 18, use of simple and low cost device controllers, the special high speed burst capability and data path multiplexing for efficiency and hardware failure handling. The input-output system has a redundant parallel design in that a partial failure may be handled by the remaining components. As previously mentioned, the auxiliary processors 16 are programmed with nano-instructions to allow them to do the testing and execution of input-output transfer thus freeing the execution processor 18 or central processing unit from the steps of input-output communications. The auxiliary processors 16 are configured on multiple input-output busses, thus providing multiple data channels, and the particular channel is determined by the supervisory processor 20 which is the ultimate controller in the system. On the channel the data exchanges are controlled by the intelligence of the auxiliary processor 16. The peripheral device controllers are controlled by the micro-programs in an auxiliary processor 16.

An auxiliary processor 16 advantageously can initiate transfer of information through a direct memory access controller 30 while itself simultaneously participating in information transfer via the I/O busses and maintaining control over that direct memory access controller 30. Transfers of information between the auxiliary processor 16 and the main store 12, between the direct memory access controller 30 and the main store 12 between auxiliary processor 16 and a device controller, and between the direct memory access controller 30 and the device controller all occur in parallel.

Whenever an auxiliary processor 16 wishes to communicate with a peripheral device it first must connect with the associated device controller. This is relatively simple since the device controller interfaces to multiple input-output paths. The initial default path of these controllers is set in hardware and is known in the software of the supervisory processor 20. On system power up or system reset all the device controllers will be on their default channel. Their operational channel will be determined by the programming in the supervisory processor 20. When required by an execution unit 86 of an execution processor 18 the associated auxiliary processor 16 will go to the correct channel by looking in a table, filled by the supervisory processor 20, for the assigned channel. To make the connection, the auxiliary processor will output the identification of the particular device controller data lines. When the input-output control lines indicate there is a device controller identification by asserting the control signals ADDRESS and DATA strobed with DAV, the device controllers check for a match with their switch programable identification. If a device controller finds an identification match it responds by asserting the control signal DACK, ending the sequence. All other device controllers whose identifications do not match are disconnected from the channel. A device controller, which is connected, recognizes all functions and data issued on the channel as intended for it until disconnected by an identification connection sequence which is not its match or by an interrupt acknowledge sequence.

When a device controller is connected it is told what to do by function codes sent from the auxiliary processor 16. To send a function code the auxiliary processor 16 puts the appropriate code for the process on the data line and flags the function by asserting a control signal CONTROL strobed with the signal DAV. When the device receives the function, it responds with the signal DACK, ending the transfer. Functions sent by the auxiliary processor 16 can be immediate orders which cause a response without further need of transfer. An example would be the sending of reset function. There are input-output functions which require data to execute, like the filling of a status interrupts enable register of the function to fill a printer's line buffer.

The foregoing communications must all be in a direction from the auxiliary processor 16 to the device controllers. The transfer of data can go in either direction. In particular, if an auxiliary processor 16 wants to output data it first transfers a function as previously explained telling the device controllers what to do with the data which will be sent. An example would be to fill a status interrupt enable register. Data is sent by putting the word on the data lines and asserting the control signal $\overline{DATA}$ to indicate it is a data word, and strobing the information with the control signal DAV. When this occurs the device controller will take the data and respond with the signal DACK then use the data as indicated by the last function sent by the auxiliary processor 16. When the auxiliary processor 16 senses the signal DACK, it knows the device controller received the data so it releases the data lines and drops the signal DAV.

Data can be input from a device controller in a similar manner. The auxiliary processor 16 would transfer a function telling the device controller to send it some particular data. Then, when the device controller sees there is a data transfer indicated by the signals DATA and DAV, it puts its data out and flags it with the signal DACK. When the auxiliary processor 16 senses the signal DACK it knows the data word is on the data lines and receivers. When the auxiliary processor 16 accepts the data word it drops the signal DAV informing the device controller which then releases the data lines and drops the signal DACK ending the transfer.

An example of the way an auxiliary processor 16 would output a message is the printing of a line by a line printer. First the auxiliary processor 16 connects to the device controller of the line printer by using the connection sequence explained hereinabove. To monitor the status of the device controller the auxiliary processor 16 could send a function to fill a status interrupt enable register, and then send an interrupt mask, if it was desired to handle status in an interrupt mode. Alternately, the auxiliary processor 16 could send a function to have the status register sent as a data transfer and poll it. The auxiliary processor 16 would then send a function which would tell the device controller to fill its line buffer with the following stream of data. Each character would be sent as a data transfer. Once the auxiliary processor 16 had sent out the characters to be printed it would send a command telling the device controller to have the line printed.

The foregoing procedure does not have to be continuous. The auxiliary processor 16 could, anywhere in the sequence, connect to a different device controller and disconnect from the former device controller to make a different transfer and thereafter reconnect to the former device controller and finish the sequence where it left off.

There is another way an auxiliary processor 16 can exchange information, which is by using the direct memory access controller 30. Basically, each DMA controller 30 is an interface between the memory bus 14 and the high speed input-output devices. The auxiliary processor 16 sets up the DMA controller 30 over the bus 102 to do a transfer between the device and memory. Briefly, the auxiliary processor 16 connects to a DMA controller 30 over the input-output bus and sends a command to operate on a free DMA channel. Then a command which sets the parameters of the DMA controller 30 is sent. After the controller 30 is set up, the auxiliary processor 16 connects to the device and commands it to operate on the DMA channel. Enabling data interrupts will start the transfer. The auxiliary processor 16 then enables the appropriate status interrupts to indicate when the transfer terminates.

Data can also be transferred within an interrupt structure. Two sets of REQ, PREACK, and RACK control signal lines, one for data transfers and one for status interrupts, are used. The interrupt sequence would proceed as follows. A device needing service will assert the REQ line which is common to all devices. The auxiliary processor 16 senses the REQ signal and responds with the PREACK signal to be followed by RACK. When PREACK is asserted all devices are forced to disconnect from the channel for the duration of the PREACK signal. When RACK occurs the highest priority interrupting device connects to the bus. Transfers can take place as if the device was connected by having its identification output.

The auxiliary processor 16 will not know which device is interrupting, so in order to get the device identification the auxiliary processor 16 asserts ADDRESS and CONTROL signals simultaneously. When the control signal DAV is sent, the interrupting device will put its identification on the data lines and return the signal DACK. When the auxiliary processor 16 senses DACK, it reads the device identification from the data lines and drops the signal DAV which causes the device to release the data line and drop the signal DACK. The state of the ninth bit, the most significant bit, will tell the auxiliary processor 16 if the interrupting device needs input or output service.

The auxiliary processor 16 can initiate any type of transfer during an interrupt acknowledge sequence in the normal way, but because data transfer should be done as fast as possible there is provided a single step data transfer method. During an interrupt acknowledge sequence, a device will respond to the signal combination of ADDRESS-CONTROL and DAV by putting its identification and the signal DACK on the bus. If the device detects a second occurrence of the above condition, it is designed to initiate a data transfer. If the transfer is an input transfer, the auxiliary processor 16 sends DAV to signal that it is ready for the data. The device responds with the data and the signal DACK. If the transfer is an output transfer the auxiliary processor 16 places the data on the data line and asserts the signal DAV. The signal DACK from the device means that the data has been received. To end the sequence, the auxiliary processor 16 simply drops the RACK and PREACK signal lines. The interrupting device disconnects and the last device which was connected by a connection sequence is back on. With the foregoing procedure, the auxiliary processor 16 is able to handle an interrupt about every 3 microseconds.

Thus, the input-output system may be viewed as comprising three groups: the auxiliary processor 16, the busses, and the various controllers wherein a bus is the interconnection path between the device controllers and the auxiliary processor 16. The device controllers for most slow speed devices such as card readers and line printers can comprise cable drivers, a buffer register, and a few control flip-flops with the auxiliary processor 16 handling such functions as control and status decisions, translation and packing. The bus can comprise a number of tristate or open collector lines which will provide a path for all data, command and control lines. If the auxiliary processor 16 and device controllers all reside physically on the same backplane, the bus can consist of a set of backplane connections.

The following signal lines make up the input-output bus. Nine data lines are used to pass data, command, and device identification information. One DAV signal line and one DACK signal line provide a send/acknowledge control line pair that indicates when a transmitting device is sending data and when a receiving device has accepted data. Two REQ and two REQACK signal lines provide two request/acknowledge pairs, one pair for data interrupts and one for status interrupts. Two sets are provided for the reason that the auxiliary processor 16 may distinguish between the two groups of interrupts. One ADDR Out line tells the devices that the information on the data lines is a device identification when the DAV signal is true and the Control/Data line specifies data. The Control/Data line tells the devices that the information on the data lines is either a function or data when the ADDR Out line is low. When Control and ADDR Out are asserted, the channel is in an interrupt sequence and all signals on the channel are ignored unless the device is selected for interrupt mode. Finally, one IORESET line initializes the devices on the channel.

Since there will be several devices connected to the bus, there is a bus protocol for communicating between the devices and the auxiliary processor 16. Except for the interrupt sequences, the auxiliary processor 16 is responsible for initiating all bus transfers. Multiple auxiliary processors may share the same bus. Attempts by more than one auxiliary processor 16 to use the same bus are resolved over a separate communication path. Except for interrupt sequences, a device must be logically connected to the auxiliary processor 16 before communication sequences may take place. The connection is accomplished as follows:

(1) The auxiliary processor 16 loads a register going to the bus with a device identification code, then asserts DAV, ADDR Out, and DATA.

(2) The auxiliary processor clock stops until the DACK signal appears or a timeout condition occurs.

(3) Each device senses the DAV and ADDR Out signals and compares the value on the data lines with identification of that device. If the data and identification correspond the device connects to the channel, sends the DACK signal and remains connected until another connection sequence occurs. The device temporarily disconnects from the bus during interrupt sequences when the ADDR Out and control lines are both asserted. When the device connects to the channel, it responds to the DAV signal with a DACK signal to indicate that it has received the command.

Once a device has been connected to the bus, the auxiliary processor 16 may do such things as load device registers, read device registers, send special functions, and place the device in burst transfer mode. The auxiliary processor 16 does not send device identification for each data transfer if the processor is communicating with only one device.

The following examples illustrate in further detail the reading and writing of device registers and show the role that function commands play in channel communication. The procedure for loading a device register is as follows:

(1) The auxiliary processor 16 connects to the device as previously described.

(2) The auxiliary processor 16 loads the bus register with the function code to be sent and asserts DAV and CONTROL signal lines.

(3) The device uses the DAV signal to load the function on the data lines into a function code register in the device and responds to the auxiliary processor 16 with the DACK signal.

(4) The auxiliary processor 16 senses DACK, drops DAV, loads the bus register with the data that will be loaded into the device register and asserts DAV and DATA.

(5) The device uses the DAV and DATA signal, along with decode logic in the device to generate a load register pulse and strobes the data lines into the register to be loaded. The device also responds to the DAV signal with DACK. The auxiliary processor 16 may keep loading the register without sending another function code since the function register will stay loaded with the function until it is reloaded, which is useful when doing such things as data transfers.

The procedure for reading device registers is very similar to the procedure for loading them. Steps 1 through 3 are the same whether loading or reading registers except for the function code. After loading the function register of a device the auxiliary processor asserts DAV and DATA to signal the device that it is ready to accept data and to generate a function pulse. The device puts the data on the data lines and sends DACK to indicate that the data is available. The device holds the data until the auxiliary processor drops DAV. When the auxiliary processor senses DACK it takes the data and drops DAV. Again, the auxiliary processor may keep reading the register without having to send a function code each time if it has not disturbed the function register.

The above procedure is sufficient to explain the operation of the channel. Once a connection between an the Auxiliary Processor 16 and a device controller is established, the transfer of data may proceed in two different ways. If the device was not put in burst mode, the transfer will be made at the request of the auxiliary processor 16, enabling the latter to process the data on the run according to preset requirements. This will typically enable data rates up to 300K bytes/second. If the device was put in burst mode, then the data is transferred at the highest speed that the device can support. The auxiliary processor 16 will do no processing on the data—it will only store the data in its memory. Typically, the data rates that can be supported will be up to 2M bytes/seconds.

While the above described procedure is the preferred way of handling data flowing in relatively low speed, it is in the nature of this invention to support very high speed data rates without the need to tie up an auxiliary processor 16. This is accomplished by using the DMA (Direct Memory Access) controllers 30. The auxiliary processor 16 is used to establish logical connections between a high speed device controller, say 108, and a DMA controller, say 30. Also, the auxiliary processor 16 is used to set up all control information for the transfer, as will be described, and to monitor end of transfer conditions. While the actual transfer is performed, the auxiliary processor is free to communicate with other devices.

The actual DMA procedure is as follows. The DMA controller 30 and the device controller have a dedicated connection 132, which is referred to as the DMA channel. As necessary, and where it will not cause confusion, path 120 will be referred to as part of the DMA channel. In addition to its data lines, the DMA channel has two control lines BREQ and BREQACK. DMA channel operation proceeds as follows:

(1) The auxiliary processor 16 connects the device to the I/O bus as described earlier and sends a command to connect the device to the DMA channel. The auxiliary processor 16 is responsible for disconnecting other devices from the channel.

(2) The auxiliary processor 16 sets up Buffer Address Register (BAR), Word Count Register (WC), and packing sequence functions. The auxiliary processor must allow status interrupts from the device so that it knows if the transfer is terminated before the word count reaches zero.

(3) The auxiliary processor 16 starts the input-output transfer. At this point, the auxiliary processor only monitors the transfer while hardware takes care of the actual routing of data and channel protocol.

(4) The data transfer is performed using the data BREQ and BREQACK lines. When the device needs data or has data to input, it asserts the BREQ line. If the transfer is input, the data must be on the data lines when the BREQ is asserted. The DMA channel controller 30 senses the BREQ and either takes the data from the data lines or puts data on the data lines, depending on whether the transfer is input or output. It then sends BREQACK to signal receipt or availability of data and end the byte transfer.

The foregoing is illustrated in further detail in connection with FIG. 4. Whenever a request is made to auxiliary processor 16 for a high speed transfer, for example from the disc 114 associated with controller 108, the auxiliary processor 16 will load the memory address and byte count information into direct memory access controller 30, the control information into the device controller 108 establishing connection to direct memory access controller 30, if such connection has not already been made, and then initiate operation of the direct memory access controller 30. All this communicating is done via one of the input-output busses 102 or 104. At the same time, the other auxiliary processor 16' can use the other input-output bus for whatever task it is doing.

Once the direct memory access transfer is initiated, both the input and output bus and the auxiliary processor 16 are free. The DMA controller 30 will feed the device 108 continuously, will buffer the data in its own memory, and will request the memory bus 14 each time a physical word, 64 or 72 bits, is available until the byte count is reduced to zero. At that point in time, the bytes which do not constitute a full word are transferred to the main memory. The data flow from the device 114 will not be interrupted but continues and is buffered in the memory of the direct memory access controller 30. If there is an interrupt, the auxiliary processor for that controller, in particular auxiliary processor 16, is interrupted indicating a status change in the DMA controller 30. At that time, the auxiliary processor 16 may stop the flow of data into the DMA controller 30 and void the first-in first-out mode of operation or it may reload the address and count registers of the DMA controller 30 with new values and direct it to transfer the data buffered in it to the next location therein or it may reload the controller with new commands and initiates a new input-output sequence.

Such operation of DMA controller 30 enables easy data and command chaining, prevents repetitive initiation of devices, and distributes the control function between the sophisticated auxiliary processors and the relatively simple DMA controllers. In byte mode, the input-output is done directly under control of the auxiliary processor 16. The architecture of the auxiliary processor is geared to the controller functions it has to perform. As previously explained, the auxiliary processor 16 has the capability to field different kinds of interrupts. Data interrupts are handled without actual interruption of the running task. Status interrupts cause rescheduling and selection of a new task.

Figure 5:
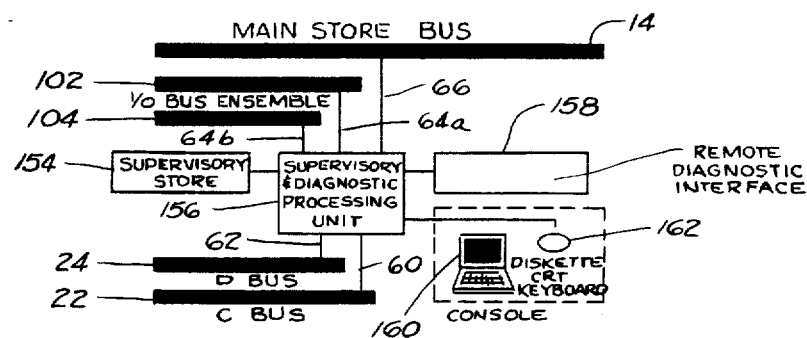
FIG. 5 is a schematic block diagram of the supervisory processor of the system of FIG. 1.

FIG. 5 illustrates in further detail the supervisory processor 20 of the system. For convenience in illustration the input-output bus ensemble 28 is shown comprising the two input-output busses 102 and 104 of FIG. 4 which are connected by paths designated 64a and 64b, respectively, to the supervisory processor. The same reference numerals as in FIG. 1 are used to identify the connections of the supervisory processor 20 to the main store bus 14, communication bus 22 and diagnostic bus 24. The supervisory processor 20 comprises a supervisory store 154 which contains the commands utilized in initializing the system, and a supervisory and diagnostic processing unit 156 for carrying out the commands in store 154 as well as performing the various monitoring procedures. The supervisory processor also includes a remote diagnostic interface 158 for diagnosis and updating of the system microcode. The supervisory processor 20 is operatively connected to the system console which in the illustration of FIG. 5 includes a c.r.t. keyboard and diskette 162.

The system of the present invention thus is a multiprocessor arrangement where some or all of the auxiliary processors 16 and some or all of the execution processors 18 may be different not only in design but also in the user instructions which the processors support. The system has the capability to accommodate additional processors with diverse instruction sets which were not necessarily known at the time the system was manufactured. The communications bus 22, diagnostic bus 24 and supervisory processor 20 support, simultaneously, such diverse processors.

The active, intelligent memory system of the present invention supports diverse memory structures which may be required by the heterogeneous nature of the system. Functions which heretofore were done by the processor or processors, will be subsumed in the memory system of the present invention, thus providing essentially the capability of an active and intelligent memory system which provides parallel, diverse memory management functions independently of the operation of the processors. The auxiliary processor 16 and execution processors 18 are able to share the memory in overlapped, shared or exclusive fashion, enabling each of the new processors to access the same information in potentially diverse form. Also, the memory system is designed and constructed in such manner that allows addition of memory structures after the whole computer system is manufactured and installed.

The data processing system of the present invention enables pooling of processor groups in the manner previously described and provides all connection, data access, control, monitoring and diagnostic capabilities to support such pooling. The system is a heterogeneous, modular expandable system in which expansion is done by properly added hardware modules, and where the total operation is under the supervision of a special diagnostic processor in the form of supervisory processor 20 which has its own dedicated diagnostic bus 24.

The system of the present invention provides input-output facilities and controls which enhance the degree of parallelism between data transfers while allowing well defined but potentially diverse loci of control in the form of the auxiliary processors 16. The input-output facilities allow both shared and exclusive access to peripheral devices by diverse input-output protocols and data structures. If the peripheral devices are exclusively assigned to any input-output procedures, then these potentially diverse procedures can proceed in parallel even if they are controlled by a single locus of control. The data processing system of the present invention has diverse parallel processing capabilities which can perform diverse processing of input-output structures independently and parallel to the processing of the potentially diverse user instruction sets. Such data processing capability may be included in the original system or added as an afterthought, completely isolating the nature of the peripheral devices from the user program. This capability, if present at all in prior art systems, was part of the instruction processor, either as separate instructions or as program sequences.

As a result of the bus connections to the processors, particularly those of the communications bus 22 and the input-output bus ensemble 28, the supervisory processor 20 is part of the group containing the auxiliary processors 16 as viewed by the execution processors 18. As a result, a request sent by the execution processors 18 to the auxiliary processors 16 may be honored by the supervisory processor 20 instead of by the auxiliary processors 16. Likewise, a request sent by the auxiliary processors 16 to the execution processors 18 may instead be honored by the supervisory processor 20.

Figure 6:
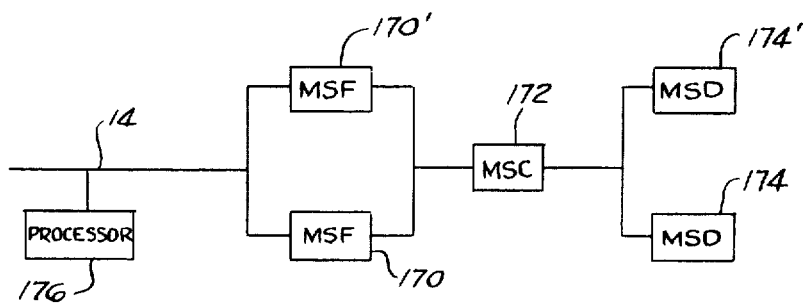
FIG. 6 is a schematic block diagram further illustrating the intelligent main store of the system of FIG. 1.

FIG. 6 illustrates in further detail the intelligent main store according to the present invention. A plurality of main store function modules 170,170' are connected to the main store bus 14. While for convenience only two such modules are illustrated in FIG. 6, additional ones can of course be included. Each main store function module 170, 170' is logically part of the main store controller, to be described, and each function module provides each special execution processor, i.e. central processor, related functions that are physically located within the intelligent main store. These include, for example, access protection, address indexing and control registers, and virtual memory control including address translation and content addressable memory. Thus, there is a multiplicity of function modules, each of which is a logical unit designed to serve a specific user, such user being any other device or component in the system which has access to main store bus 14 and can assert control over it. The intelligent main store further comprises a main store controller module 172 which is operatively connected to each of the main store function modules 170, 170'. The main store controller provides all timing and control needed for accessing all portions of the intelligent main store as well as providing single bit error correction-double bit error detection circuitry and diagnostic support circuitry. The intelligent main store, finally, includes a plurality of main memory data modules 174 and 174'. Only two are shown in FIG. 6 for convenience in illustration although typically a large number are provided. Each data module contains a large number of bytes of storage organized in terms of 8 byte words plus error correction.

In the intelligent main store of the present invention, the addresses given to the memory are logical rather than physical. As a result, the memory will accept as valid, addresses for non-existent storage and will act on them in accordance with the function modules included. In the intelligent main store of the present invention certain operations, resolution of differences, etc. conventionally performed at the processor level in a system are performed in the main store. For example, page faults instead of being signalled back to the user are handled internally in the main store by a function module designed specially to do that.

In the system of the present invention the various ports, i.e. the execution processors 18, auxiliary processors 16 DMA controllers and supervisory processor 20, request access to the intelligent main store and are granted access on a fixed priority basis. In the general case, a processor designated 176 in FIG. 6 is operatively connected to the main store bus 14 and has the capability of accessing the main store. In addition to representing one or more of the processors of the system of the present invention, this processor 176 could be a machine similar to that shown in U.S. Pat. No. 3,766,532 issued Oct. 16, 1973 and assigned to the assignee of the present invention. The disclosure of that patent is hereby incorporated by reference. The MIX and MOD connections to the local store as shown in FIG. 1 of that patent would be replaced by connection to the main store bus 14. The control fields T3,T7 and T37 also are operatively connected to control lines of the main store bus lines 14. These controls are interpreted by a function module in the intelligent main store to serve as a memory for the system shown in that patent. Also, in col. 33 of that patent, other appropriate connections are identified. By way of further example, a function module so designed could interface a peripheral memory to the system main memory which function module will cause virtual memory management independent and parallel to any user.

In the exemplary embodiment of the present invention, the multiple main store function modules 170,170' are employed to enable up to four different processor types to access the main store, each processor using different protection mechanisms and related functions. The single main store controller module 172 handles all storage control and timing logic as well as error detection and correction circuits. Many main memory data modules 174,174' may be used with logical address space being 32 bits wide and physical address space being 25 bits wide as determined by the main store controller 172. In addition, diagnostic paths are provided in all the sections of the main intelligent main store. Such paths are not described herein and are not necessary for operation of the intelligent main store.

The 104 address/data lines and the 41 control lines of main store bus 14 can be used depending on the function module selected. As an example of a particular possible usage of these lines, the main store bus 14 includes 72 data bits arranged in eight bytes of data, nine bytes each. There are 32 address bits which identify logical or real addresses. There are eight byte control bits whereby each bit determines whether that particular data byte is written into memory on a write cycle. There are six identification bits, four of which specify which port is accessing the main store and two of which indicate which main store function module path is to be used. There are four key bits and an enable bit which specify the particular code for main store protection within the main store function module and whether or not it should be activated. Each module contains a different protection mechanism determined by its respective processor in the system and these bits specify that mechanism. Two exception bits relate to functions known as address out of range and protection exception. There is a read/write bit which specifies a read or write operation. There are six arbitration bits which serve as a priority arbitrator, and there are six function bits which define the main store operation. Finally, there are fourteen parity bits to determine bus failures.

The main store bus 14 is a time division multiplexed bus with each prot, i.e. processor, gaining access to the bus through an asynchronous arbitrator. Once one port is in control of the bus, the 32 address bits, eight byte control bits, four key bits, six identification bits, six function bits, read-write bit, and data bits and parity bits if a write mode is occuring, are enabled onto the bus. The six function lines define the type of access to the main store system. The supervisory processor 20 uses some of these function codes to excerise the main store in a diagnostic mode. The main store bus 14 completes its cycle by returning data during a read operation and issuing a "data available" signal in either the read or write mode which releases the arbitration circuit for the next cycle.

Figure 7:
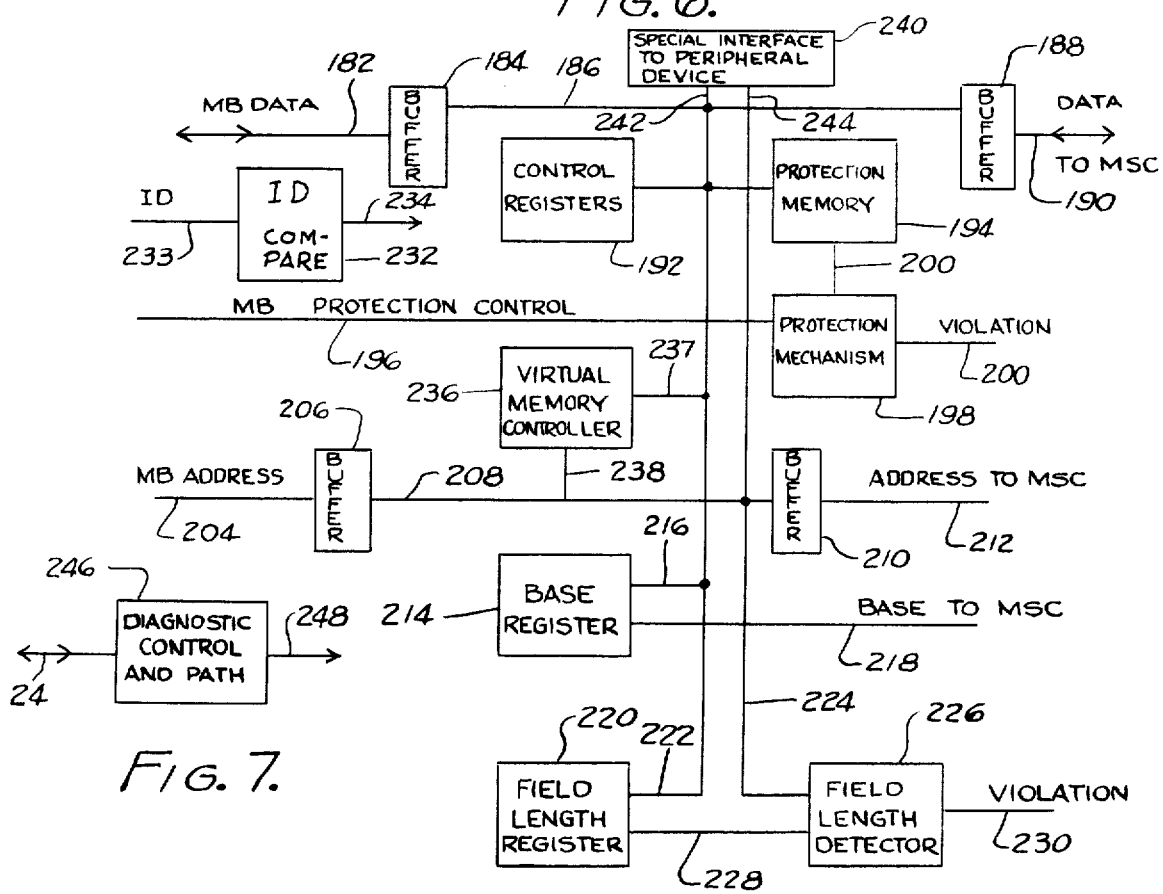
FIG. 7 is a schematic block diagram of a main store function module of the intelligent main store shown in FIG. 6.

FIG. 7 illustrates in further detail one of the main store function modules, for example module 170. By way of example, the main store function module described herein is for use in connection with emulating an IBM 370 machine, and the module illustrated in FIG. 7 implements virtual memory control including address translation and content addressable memory in a manner which will be described in detail presently.

Only five functions explicitly access the main store function module 170, and any other main store accesses are transmitted through to the main store controller module 172. In this connection, there is a bidirectional data path 182 leading from the main store bus 14 to a buffer 184, an internal data path 186 connected between buffer 184 and another buffer 188 which, in turn, is connected to a bidirectional data path 190 leading to the main store controller module 172. The five functions which explicity access the main store function module 170 are known as the storage key, control register, reset reference bit, base register and field length register functions.

An arrangement of a plurality of control registers 192 is connected to the path 186 for receiving data therefrom. This is an 8K bit control register organized as 256 words each 32 bits wide and is subdivided into four 64 word sections. The control register 192, which may be viewed as a high speed control memory, is accessed by issuing a read-write cycle to the main store with a function of one. In the illustrative system, data is placed on the main store bus data bits numbered 32–63. Each of the four 64 word sections is addressed by using the main store bus identification bits numbered 2 and 3 as the two most significant address bits and by using the six lower order or least significant bits of the main store bus address for specifying the remaining address bits. The size of the control register arrangement 192 can depend upon the specific main store function module which is referenced. The control register arrangement 192 is used for multiprogramming purposes or other programming purposes determined by the specific processor involved.

The main store function module 170 illustrated in FIG. 7 provides protection against improper main store access. To this end, a memory designated 194 is connected to the path 186 for receiving data therefrom and contains the main store protection information. Information concerning the particular access requested is present on line 196 from the main store bus 14 which line 196 is connected to one input of a protection mechanism or comparison mechanism designated 198. The output of memory 194 is connected by line 200 to another input of the mechanism 198. If the access is improper, a violation is signalled on a line 200 which transmits a command signal to the main store controller module 172 to prevent the access. In particular, this means that on fetching, the information is not available to the processor and on storing the contents of the storage location are not changed. An error indication also is returned to the processor.

For use in emulating an IBM 370 machine, memory 194 is a 56K bit memory provided for "key in storage" to implement page replacement algorithms and storage protection. The memory space is organized as 8K by 7 bits. The 7 bits appear as the main store bus data bits numbered 56–62 in the illustrative system when reading or writing the storage key memories. Reference, either explicit or implicit, is made using the main store bus address bits number 8–20. This provides protection for a total of 16 Megabytes of memory in 2K byte blocks. The field contains four access control bits, a fetch protection bit, a reference bit and a change bit.

Thus, when an access is requested, the protection key associated with request for storage access is transmitted on line 196 to the comparison mechanism 198. The four access control bits of the key in storage are matched against the four bit protection key to determine whether or not access is permitted. As to the remaining bits of the storage key field, the fetch protection bit applies to fetch-type references, and a zero in this bit position indicates that only store type references are monitored and that fetching with any protection key is permitted. A one in this bit position indicates that protection applies to both fetching and storing. Both the references bit and the change bit are associated with dynamic address translation. The reference bit normally is set to one each time there is reference to a location in the corresponding storage block either for storing or fetching information, and the change bit is set to one each time information is stored into the corresponding storage block. The reset reference bit instruction clears the reference bit in the key in storage memory as well as reading back the entire 7 bit field.

The address bits from the main store bus 14 are transmitted through a first path 204, a buffer 206, an internal path 208, another buffer 210 and an external path 212 to the main store controller module 172.

The main store function module 170 further includes means for obtaining a physical main store address in the form of a base register 214 having a path 216 for receiving data connected to the path 186. A base register command (not shown) loads and reads the base register 214 in the appropriate mode, the command being sent over the main store bus 14. The base register bits are the sixteen bits numbered 48 through 63 of the main store bus data. These are sent to the main store controller 172 over path 218 and there they are added to the bits 0–31 of the main store address to obtain the physical main store address. In the main store controller 172 the base register is added to the two most significant bytes of the address. Thus, when access to a normal main store location is executed, the base register 214 in the main store function module 170 is added to the most significant address bits and any overflow is ignored, this being done in the main store controller module 172. The result is the physical main store address.

The main store function module 170 further comprises a field length register 220 having a path 222 for receiving data connected to the path 186. The main store bus address, i.e. bits 0–31, also is compared against the field length register 220. If the address is greater in width than the word stored in the field length register 220, the address is said to be out of its physical memory space and is intruding on another user's space. An address exception signal is returned with no data having been read and no memory modifications having been performed. The address exception signal is a non-programmable error bit. In particular, the main store bus address on path 208 is connected by a path 224 to one input of a field length detector or comparator 226. A path 228 transfers the contents of field length register 220 to another input of the comparator 226. If the address on path 228 is greater than the address on path 224, the address exception signal appears on line 230.

The main store function module 170 further comprises an identification code comparison means 232 which receives a two bit identification code on path 233 from the main store bus 14. If the code on path 233 matches the code for this particular module stored in the comparator 232, an enabling signal for the module appears on line 234 which, in turn, is connected to the active components of the module 70, i.e. control registers 192, protection memory 194, protection mechanism 198, base register 214, field length register 220 and field length detector 226. The main store bus 14 also will send an operation code known as clear main store function module at appropriate times.

The main store function module 170 further comprises a virtual memory controller 236 which provides translation of address from logical to real for the execution processor in a manner which will be described. Controller 236 is connected by path 237 to the data path 186 of module 170 and it is connected by path 238 to address path 208. The enabling signal line 234 from component 232 also is connected to controller 236.

The main store function module 170 also can include a special interface 240 to a peripheral device which interface 240 is connected by a path 242 to the data path 186 and is connected by a path 244 to the address path 208 as shown in FIG. 7. As a result, main store function module 170 can be directly connected to a peripheral storage device through interface 240 so as to provide autonomous virtual memory management without processor or operating system intervention. In addition, the foregoing can be provided for any number of the main store function modules.

Diagnostic control and paths generally designated 246 in FIG. 7 are provided for the main store function module 170, and connections to appropriate components of the module are collectively designated 248. The control and paths 246 also are connected to the diagnostic bus 24 as shown in FIG. 7.

Thus, the main store function module 170 may be viewed as function means for providing internal to the main storage means the capacity of virtual to physical address translation, base register addressing, memory protection and data remapping. Furthermore, there can be a multiplicity of function means like module 170, each capable of implementing diverse virtual to physical address translation methods, memory protection methods or data remapping methods.

Figure 8:
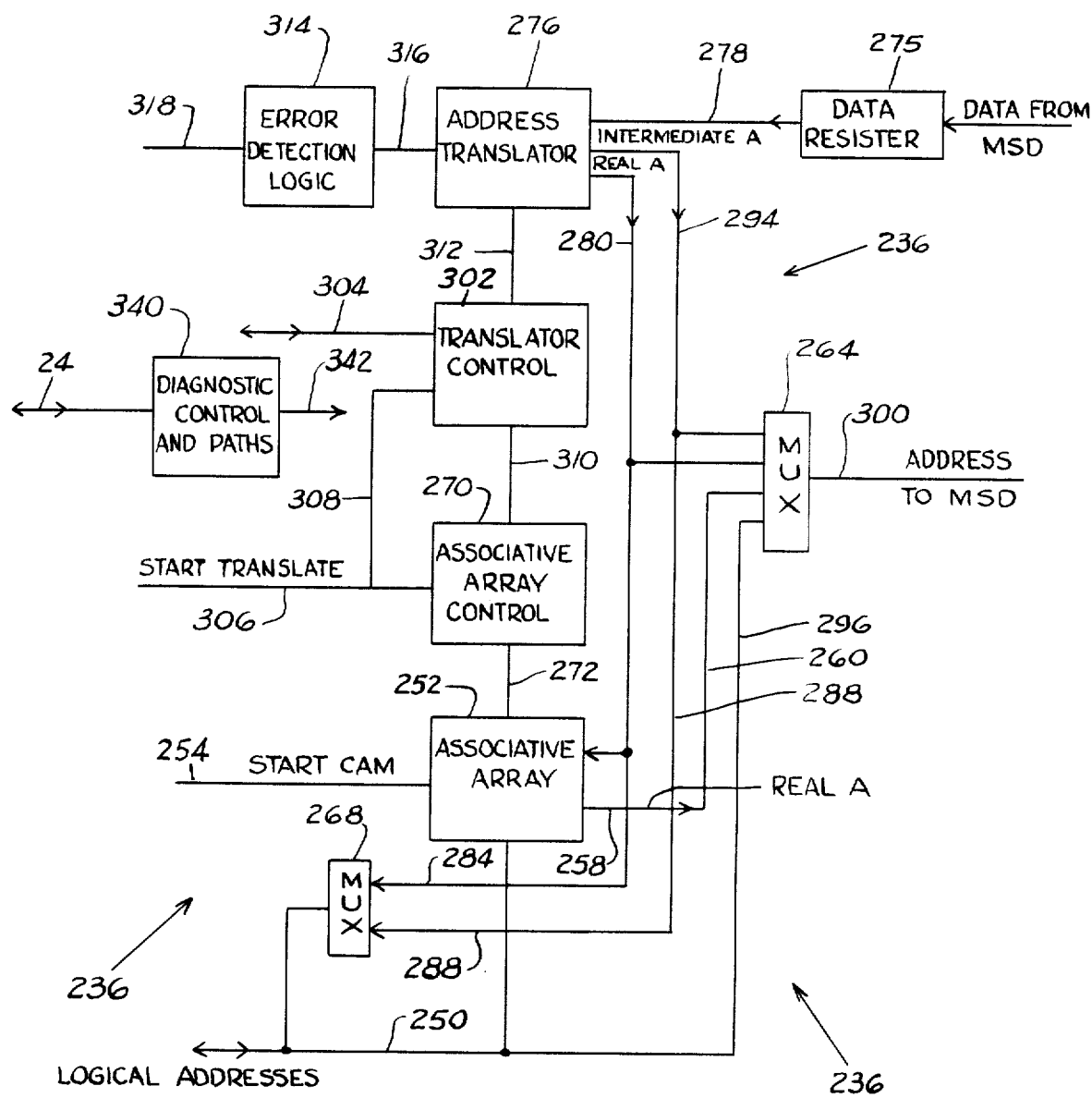
FIG. 8 is a schematic block diagram of the virtual memory controller in the function module shown in FIG. 7.

FIG. 8 shows in further detail the virtual memory controller 236 of the main store function module 170 of FIG. 7. The virtual memory controller 236 receives logical addresses from a port in the system, in particular from an execution processor 18, along a path 250 connected to main store bus 14. These logical addresses are transmitted to an associative array designated 252 which includes the combination of a CAM (content addressable memory) and a RAM (random access memory). The CAM is a sixteen entry type wherein each entry includes 13 logical address bits, one reference bit, and one valid bit. The RAM is also a sixteen entry type wherein each entry includes 13 real address bits. The CAM has 2K and 4K page sizes. Associated with the associative array 252 is appropriate functional logic 270 providing entry replacement, hit detection and insertion control. Suitable control logic is connected in controlling relation to the array and to the functional logic, the control logic operating in response to a START CAM signal on a control line 254. A real address output provided by associative array 252 is present on an output path 258 which is connected by one branch path 260 to one input of a multiplexer 264, the outlet of which goes to the main store controller. This path supplies the address to memory when the address was contained in the array 252. When an entry is not in the array, the address translator 276 performs its translation function and inserts the result along paths 280 and 282 under control of the control logic 270. The associative array control logic 270 also synchronizes operation of the associative array 252 with other components of the virtual memory controller 236 and provides other appropriate control for the operations specified. The control 270 is connected to the array 252 by a path 272.

The virtual memory controller 236 further comprises an address translator designated 276. Data bits read from the main store data modules 174 are received in a data register 275 from which they are transmitted along a path 278 to the input of translator 276. The translation process requires multiple accesses to main store. For background information on such translation process, reference may be made to *Operating Systems: A System-*

*atic View* by William S. Davis, Addison-Wesley 1977, the disclosure of which is hereby incorporated by reference, and in particular to Chapter 15 beginning on page 271. The address in each case is sent along path 294. The translation result provided by the address translator is sent along a path 280 to another input of the multiplexer 264. The translation result also is sent along one branch path 282 to an input of the associative array 252, for insertion for future associations to the array, and also along branch path 284 to another input of multiplexer 268. This is for results of special instructions. In this case the resultant address is to be returned. The output of multiplexer 268, which is a real address, is applied through the path 250. The other input of multiplexer 268 is connected by a branch path 288 to the data path 294. This path is for returning an error address, during special instructions.

An intermediate address output provided by the translator 276 is transmitted by the path 294 to a third input of the multiplexer 264. A fourth input to multiplexer 264 is connected by a branch path 296 to the logical address path 250. This serves as a path when no translation is desired. The multiplexer 264 selects among the inputs on the four paths 260, 280, 296 and 294 and provides an output on a path 300 which is sent to the main store controller as a memory address.

There is associated with the address translator a translator control designated 302. The translator control 302 includes logic which provides all timing and control to address translator logic 276, multiplexer 264, and error detection logic 314. It controls sequencing of main store requests to acquire segment and page tables to complete the desired translation. Control signals from the main store bus 14 are transmitted to the translator control 302 along a path 304. A START TRANSLATE control signal also from the main store bus 14 is connected by a line 306 to associative array control 270 for synchronization and by a branch line 308 to the translator control 302. Associative array control 270 is connected through path 310 to translator control 302 which, in turn, is connected in controlling relation to address translator 276 through a path 312. Also associated with translator 276 is an error detection logic circuit 314 connected by a path 316 to the translator and providing an error signal output on a path 318 connected to the main store bus 14. Logic 314 detects any one of five translation errors which could occur during the translation process. If an error occurs, logic 314 causes termination of the translation process and returns an appropriate error flag to the processor. Diagnostic control and paths designated 340 are connected by lines collectively designated 342 to appropriate locations in the virtual memory controller 236, the control and paths 340 also being connected to the diagnostic bus 24.

The virtual memory controller 236 provides translation of logical addresses supplied by and available to programs in the execution processor 18 to real addresses in the main memory. The execution processor 18 has the capacity to access the main memory through the virtual memory controller 236 in many different modes which are specified by the function lines. Either the execution processor 18, through microcode routines, or the supervisory processor 20, through the diagnostic bus interface, is capable of executing any of the functions defined. The functions specify either normal or diagnostic control through the virtual memory controller and the main memory.

The virtual memory controller 236 of the present embodiment uses four different functions or commands identified as normal, translate/no access, load real address, and purge. A normal access command associates the most significant address bits in the sixteen entery CAM of the array 252. If a hit in the CAM occurs, meaning the upper address bits of a logical address match a CAM entry and the valid bit associated with that entry is a one, then the real address from the CAM is concatenated with the lower bits and a main memory access is initiated. Array 252 is provided with internal wiring to provide this concatanation. If no hit occurs in the CAM, then the address translator 276 functions to translate the logical address into a real address which then is present on path 280. When translation is completed, a main memory access at the real address is initiated and the real address replaces an old CAM entry. This is provided by the connection from translator 276 to array 252 through path 282. Any error detected by logic 314 causes a signal to end the cycle immediately.

The load real address command bypasses the associative array 252 completely and does a translation using the address translator 276. The result is placed in the associative array 252 by translator 276 over paths 280 and 282 and it also is returned to the execution processor 18 through path 250. Any occurrence of errors detected by logic 314 ends the cycle immediately and the error address also is returned to the execution processor 18 over the paths 294 and 250.

The translate no access command associates the upper address bits of that command in the CAM. If a hit occurs, the cycle ends returning no errors. This indicates that the page, i.e. block of address for translation from logical to real, is in the main memory. If no hit occurs, then operation of the translator 276 is started by a signal on line 306. If no errors occur, then the real address is placed in the CAM and the cycle ends. Otherwise, the cycle ends immediately upon error indication and that status is returned. Finally, the purge command resets all valid bits, and this essentially removes all entries from the CAM.

Turning now to the function of the content addressable memory within array 252, initially upon power up and after every execution of a purge command, all valid and reference bits of the entries are cleared. When an address association starts, the logical address must match the input address as well as the valid bit equaling one in order to have a hit. The valid bit equaling one signifies that the real address associated with it is valid, being written from a previous translation. As addresses are translated by the address translator 276, they are placed in the CAM for fast translation on future references to the main store. The process by which CAM space is allocated and all old pages are replaced uses the reference bit of the CAM entry in the following manner. When a page is to be placed in the CAM, it is placed in the first entry where the reference bit equals zero. When this happens, or when a CAM hit occurs, the reference bit is set to equal one and the entire CAM is checked for at least one reference bit equaling zero. If setting the reference bit equal to one sets the last reference bit, then all other reference bits in the other entries are reset. This assures that there is always at least one entry with a zero reference bit where replacement can occur.

A number of function codes can be provided for diagnostic purposes in the virtual memory controller 236. For example, one function code is employed to access the associative array 252 directly. By way of illustration, the address lines numbered 28-31 on the main store bus 14 are used to determine the entry selected, while the data lines numbered 35-63 on that bus reflect the content. Another code is employed to access the data register 275 directly. Data register 275 holds data returned from the main store data modules 174 during translations, and also during access of main store 12 by the supervisory processor 20. Additional background information on dynamic address translation and virtual storage may be obtained from the previously referenced textbook entitled *Operating Systems: A Systematic View*.

Figure 9:
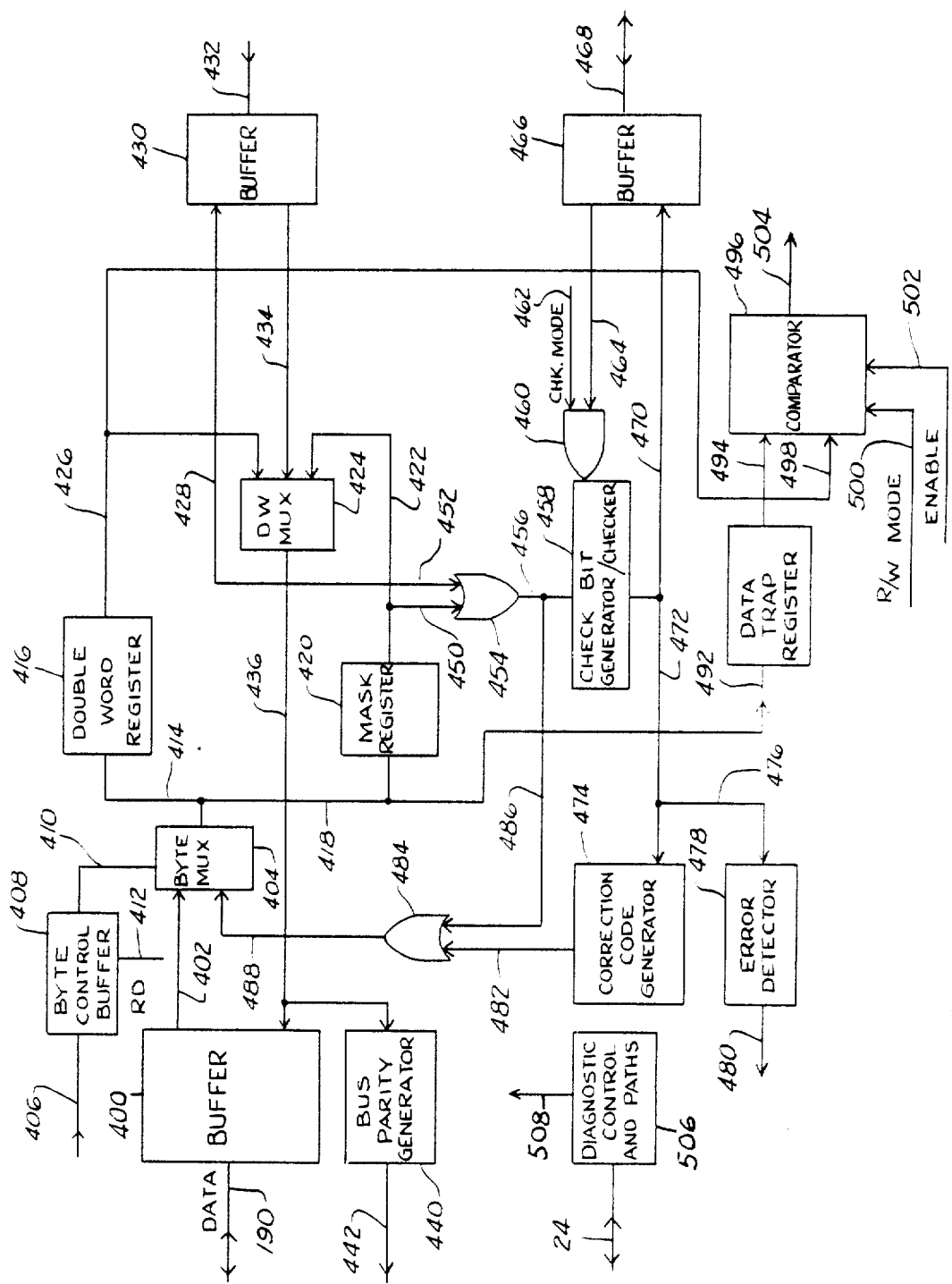
FIG. 9 is a logic diagram of the data logic path of the main store controller of the intelligent main store shown in FIG. 6.
Figure 10:
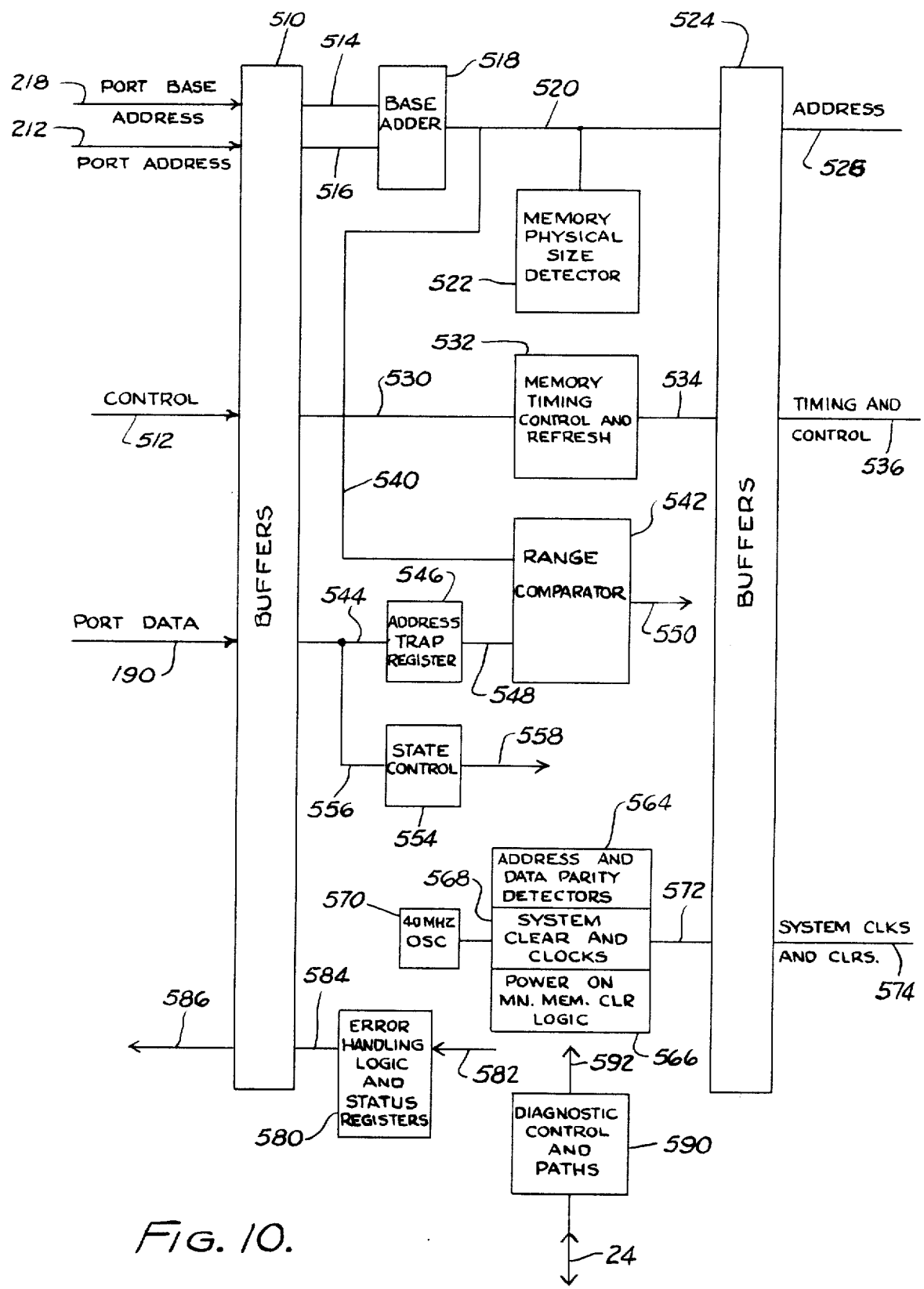
FIG. 10 is a logic diagram of the address and control logic path in the main store controller of the intelligent main store shown in FIG. 6.

The one main store controller 172 in the arrangement of FIG. 6 provides all the necessary timing and control needed for accessing all of the main memory data modules 174 as well as full single bit error correction-double bit error detection and diagnostic support circuitry. The main data path logic of the main store controller 172 is shown in FIG. 9 and the address and control logic paths are shown in FIG. 10. Referring first to FIG. 9, the bidirectional data bus 190 from a main store function module 170 shown in FIG. 7 is connected to a buffer 400. The path 190 contains 8 bytes where each byte could be either 8 or 9 bits wide. An 8 byte path 402, from buffer 400 is connected to one input of a byte multiplexer 404. The particular bytes of the eight data bytes to be written in the main memory are enabled by the eight byte control lines or bits on a path 406 connected to a byte control buffer 408, the contents of which are transferred by a path 410 to a cotrol input of the multiplexer 404. The byte control bits in buffer 408 are controlled by a read control signal on line 412. In the read mode, all lines of the path 410 are forced to enable reading of all 8 bytes of data. In the write mode, all lines of path 410 exhibit senses of the byte control lines in path 406 to enable writing of only specified bytes. These controls are necessary since an entire double word (72 bits) of data are accessed simultaneously. A read modify write is effected for byte writeability.

The output of the byte multiplexer 404 is transmitted over an 8 byte path 414 to a double word register 416. The double word register 416 is the only clocked register in this memory access path and is used to hold data transfers and to exercise logic in the diagnostic mode. The output of multiplexer 404 also is connected by a path 418 to a mask register 420 which, in turn, is connected by a path 422 to one input of a double word multiplexer 424. The contents of the double word register 416 are transferred by a path 426 to another input of the multiplexer 424. The output of the multiplexer is connected by a path 428 to one side of a buffer 430, the other side of which is connected to a bidirectional 8 byte path 432 leading to the main store data modules. Data read from the main memory sent along path 432 is received in buffer 430 and transmitted by a path 434 to a third input of the multiplexer 424. The output of multiplexer 424 also is connected by a path 436 to the buffer 400 and also by a branch path 438 to a bus parity generator designated 440. An eight bit path 442 transmits bus data parity bits to the main store bus 14.

The logic circuit of FIG. 9 further includes error detection and correction circuitry. In particular, the paths 422 and 436 are connected by branch paths 450 and 452, respectively, to inputs of a bit flip gate 454, the output of which is connected through a path 456 to a check bit generator/checker circuit 458. The circuit 458 has an input or control gate 460 associated therewith. One input to gate 460 is a check mode control signal on a line 462. The other input is an eight bit path 464 leading from a buffer 466 which, in turn, is connected to an eight bit bidirectional path 468 connected to the main store data modules. The output of the check bit generator/checker circuit 458 is connected by one eight bit path 470 to the buffer 466 and also is connected by another eight bit path 472 to a correction code generator circuit 474. Correction code generator 474 includes logic necessary to select one of 72 lines to activate which will be used for correcting the error data. This is done by decoding the 8 error correction code lines of path 472 into 72 correction lines comprising the path 482. The path 472 is connected by a branch path 476 to the input of an error detector circuit 478, the output of which is present on a line 480. Error detector 478 includes logic which can input the 8 error correction code lines and determine whether a single bit error or double bit error occurred. The output of the correction code generator 474 is connected by a path 482 to one input of a corrector gate 484. The other input to gate 484 is obtained through a path 486 leading from the output of the gate 454. The output of the corrector gate 484, in turn, is connected by a path 488 to another input of the byte multiplexer 404.

The circuit of FIG. 9 further includes a data trap register 490 which is filled by bits from a path 492 leading from the path 418 and which is connected by a path 494 to the input of a comparator 496. Another input to the comparator 496 is provided by a path 498 leading from the path 426. R/W MODE and ENABLE signals are connected to comparator 496 by lines 500 and 502, respectively. The output of the comparator 496 is a data trap signal present on the line 504. Diagnostic control and paths designated 506 are connected by lines collectively designated 508 to appropriate locations in the arrangement of FIG. 9, the control and paths 506 being connected to the diagnostic bus 24.

In operation, during the read mode, when the data and check bits are returned from an addressed main memory data module, data is passed through the buffer 430, the multiplexer 424 and through the bit flip gate 454 into the error correcting logic where the data is combined with the check bits from circuit 458 to form eight appropriate correction bits on path 472 to be used by the error corrector 474 to modify the data on path 486. The corrected data on path 488 then is gated through the byte multiplexer 404 to the double word register 416 where it is clocked into and sent along path 436 and through buffer 400 via path 190 to the port, i.e. the processor, initiating the cycle. During a write mode the same procedure occurs up to the point where the corrected data is written into the double word register 416. At the byte multiplexer 404 the selected bytes to be written into the main memory, as determined by the output of the byte control buffer 408, are placed into the double word register 416 with the existing data that is not to be changed. This new double word is then sent to the appropriate main memory data module through path 426, multiplexer 424, path 428, buffer 430 and path 432. In addition, it is also sent through the error correction logic to generate the check bits which also are sent to the appropriate main memory data module. In particular, this is done through the bit flip gate 454 and path 456 to the check bit generator 458 and then along path 470 to the buffer 466 to the path 468.

Being located at the end of the main memory path, the main store controller detects parity errors that are created in both the data and address paths. When returning data to the port, the main store controller also generates parity for error detection in the port, this being done by the bus parity generator 440. Various main store function codes are employed to control the various states of the data path logic circuit of the main store controller 172. Both on line and off line diagnostic capabilities exist using these functions. Any error condition arising from the use of these special state controls is detected by means of the diagnostic bus 24. For example, a data register function provides the capability to load and read the 8 byte double word register 416 directly. In order for this to occur the byte controls from the buffer 408 must be active. A bit flip mask function accesses the read/write bit flip mask register 420 in the data path logic. The data trap register 490 is a read/write register which holds the data word to be used for comparison against the data word from the main store to generate data trap interrupts. In particular, the main store data word on line 498 is compared by the circuitry 496 with the trap value stored in register 490. When the trap value matches the data, when the enable bit is set, and when the R/W mode bit matches, an error condition will be generated. A R/W mode bit enables the comparator 496 to match on either a read operation, a write operation or both. These two control bits, i.e. R/W and ENABLE, originate from the state control 554 in the arrangement of FIG. 10 which will be described presently. This condition or signal will be present on line 500. Comparison is done on a byte basis and each byte may be independently maskable. A particular main store function represents the mask byte for the data trap. When a bit is zero in this byte the corresponding byte in the data word is not compared.

The error correction circuit includes single bit error correction, double bit error detection circuitry. This is enabled or disabled by using a particular main store function. When enabled, any single bit storage failures will be corrected automatically. Error circuitry is unaffected by the control bit. The bit flip mask register 420 provides a means to force independent multiple or single bit errors into the data path of the single bit error correction, double bit error detection logic to determine where failures occur. This bit flip mask register 420 is enabled by a particular main store function. When any bit in the mask register 420 is set to zero, the incoming data bit is inverted, and if the error correction circuitry is functioning properly, data will be corrected and an error will be sensed. This mask can be used for both single bit error correction, double bit error detection hardware fault check and fault diagnosis.

FIG. 10 illustrates the main store controller address and control paths. The port or processor base address is conveyed along the 16 bit path 218 from a main store function module 170 and applied to an arrangement of buffers 510. The port or processor address on the 32 bit path 212 from the main store function module 170 is connected to the buffers 510 as well as the port data signal on path 190. In addition, control signals on a path 512 from the main store function module 170 are connected to the buffers 510. The port base address and the port address signals leave the buffers 510 on paths 514 and 516, respectively, and are applied to the inputs of a base adder 518. The base adder 518 is a 16 bit adder and functions to add the base address from the main store function module to the most significant bits of the incoming address to generate an absolute address present on path 520. This is an address to the actual main memory data module. The adder 518 is disabled or enabled by a particular function and bit setting in the state control register 554. Overflow detection is provided by means of a physical memory size detector 522 connected to the path 520. Detection is accomplished by comparing the upper 16 address bits with a known fixed maximum memory size. Any error is returned over the diagnostic bus interface. The path 520 is connected to a buffer 524, and a path 526 leading therefrom transmits the absolute address to the main memory, i.e. main memory data modules. The buffered control signals from line 512 are applied by a path 530 to a logic circuit 532 for generating memory timing, control and refresh signals. The signals provide for periodic refreshing, precharging, address multiplexing and operation timing for the main store data modules which are comprised of dynamic access memory chips. These characteristics are all controlled by the main store controller 172 and there is no programmable control over any of these characteristics. Refreshing is done by a cycle stealing technique. The output of the logic circuit 532 is transmitted by a path 534 through the buffers 524 and then along a path 536 to the appropriate locations in the main store data modules.

The arrangement of FIG. 10 includes circuitry for comparing the physical address generated by adder 518 with a trap value. In particular, the path 520 leading from adder 518 is connected by a path 540 to one input of a range comparator 542. A path 544 leading from the buffer 510 transmits bits from the path 190 to an address trap register 546 for storing the trap value during a specified main store operation. The bits stored in register 546 are transmitted through a path 548 to another input of the comparator 542. The address trap register 546 contains an upper and lower 24 bit address used to generate the error or trap conditions. This is a read/write register. The data field includes one bit serving as a read mode for the data trap, another bit serving as an enable read/write mode comparison for the address trap, another bit serving as a read mode check for the address trap, 29 bits serving as an upper address range byte and 29 bits serving as a lower range address. When the address is between and upper and lower bounds, when the enable bit is set, and when the read/write mode enable switch is off, an error condition will be generated. When the read/write mode enable switch is on, the mode specified must match also. Trapping on equivalence with an address is possible if the upper and lower bounds are equal. The address trap indication is present on line 550, and it is sensed as an interrupt condition by error handling logic 580 which will be described presently. Line 550 also is connected to most of the components in the arrangements of FIGS. 9 and 10.

The circuit of FIG. 10 further comprises an information register designated 554 which is a write only register containing information about the state and interrupt conditions in the main store controller 172. A path 556 transmits bits from the path 544 to the register 554. The output signals for indicting the various conditions or states and for generating interrupts are present on a plurality of lines collectively designated 558 which are connected to all components in FIG. 10.

The arrangement of FIG. 10 also includes address and data parity generators and detectors designated 564. Since the main store controller 172 is located at the end of the main memory path it detects parity errors that are created in both the data path and address path. The arrangement also includes logic circuit means designated 566 for generating the power on command and the main memory clear signal. There is also provided logic designated 568 for generating system clear and clock signals, this logic being timed by a 40 megahertz generator 570. The system clear and clock logic circuits 568 are connected by a path 572 to the buffers 524 and a path 574 leading from buffers 524 is connected to all points in the system needing clear signals and clock signals. In particular, path 574 contains clock signals at frequencies of 40 mhz, 20 mhz, 4 mhz, and 1 mhz along with the clear signal. The arrangement of FIG. 10 finally includes error handling logic and status registers 580 for detecting any error conditions arising from use of special state controls in the main store controller 172. The logic is connected to all components of the arrangement of FIG. 10 by lines collectively designated 582. The output of unit 580 is connected by a path 584 to buffers 510 and then by a path 586 to the diagnostic bus 24. In addition, diagnostic control and paths designated 590 are connected by lines collectively designated 592 to appropriate locations in the arrangement of FIG. 10. The control and paths 590 also are connected to diagnostic bus 24.

A number of conditions in the main store controller 172 can cause interrupts. The conditions are all independently enabled by the state control 554 to generate interrupts. Any condition which causes an interrupt may also independently be allowed to cause a main memory halt which will freeze the main memory from any other accesses until it is reset by the supervisory processor 20. Illustrative conditions are address transmission parity error, data transmission parity error, correctable (single bit) storage error, uncorrectable (double bit) storage parity error, and address or data trap. When any of these conditions are active and enabled to halt the main memory, the interrupt will be sent to the supervisory processor 20 over the diagnostic bus 24 and the condition causing the interrupt will be read also by means of the diagnostic bus 24. In particular, various status bits associated with these conditions may be read through the diagnostic bus connection to the main store 12 and then read as data. There will be an interrupt identification. The status register 580 can be reset by issuing a control signal over the diagnostic bus 24.

Figure 11:
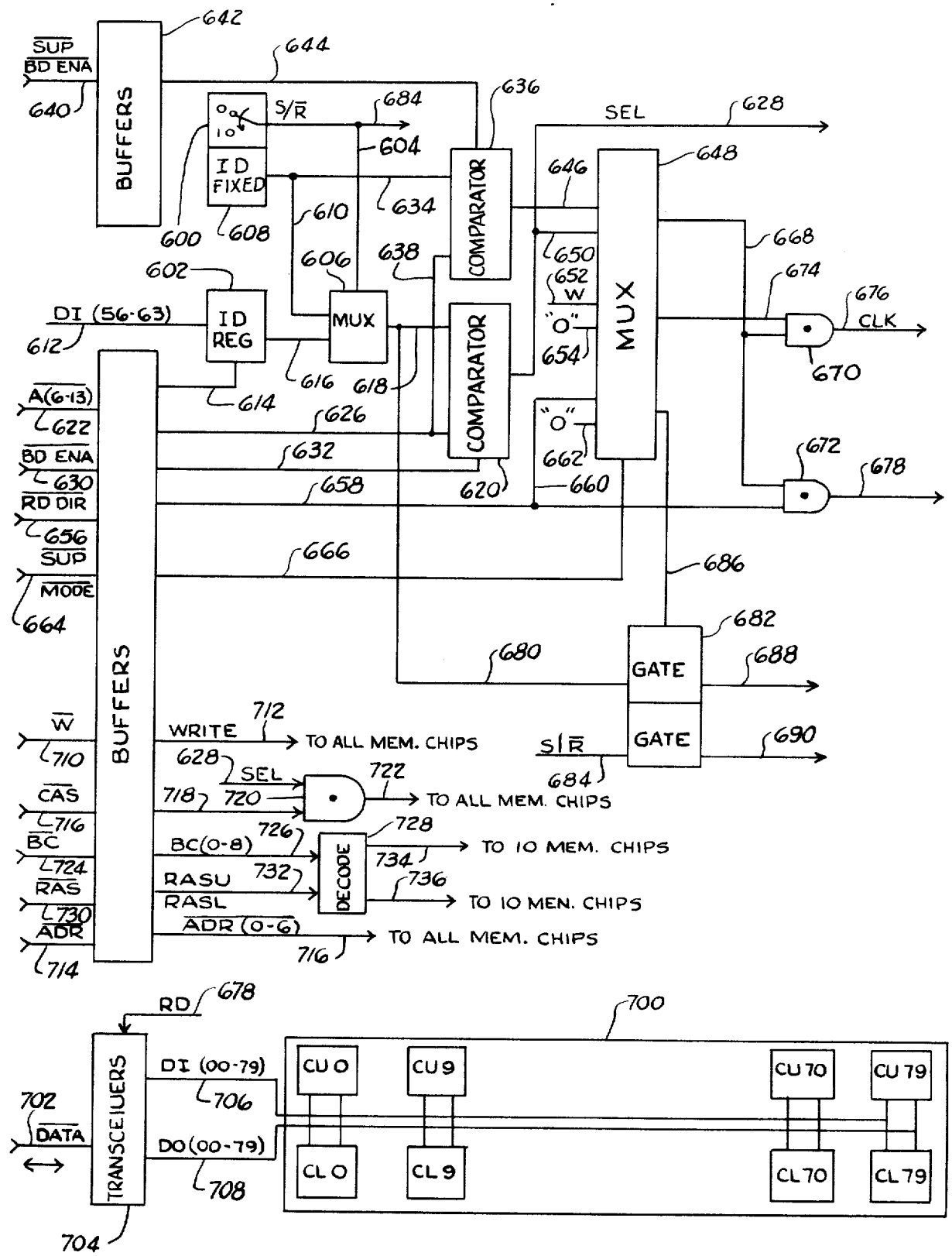
FIG. 11 is a logic diagram of a main store data module of the intelligent main store shown in FIG. 6.

FIG. 11 illustrates one of the main store data modules 174 of the main memory. The number of data modules 174 included in the system can be varied, and each main store data module 174 contains 256 kilobytes of storage organized as 32 K by 72 bit words plus error correction. The supervisory processor 20 has limited explicit control over the main store data modules 174, although it can access any of them through normal main store accesses. The supervisory processor 20 can load and read an identification register that identifies the main store data module on a logical basis.

In the illustrative embodiment, the address lines numbered six thru thirteen on the main store bus 14 are compared against the aforementioned identification register, and where a match occurs that main store data module stores data during a write operation and sources data during a read operation. Each main store data module 174 has a unique identification for proper operation. The supervisory processor 20 accesses the aforementioned identification register by executing a particular function with the board address in the bit positions six thru thirteen in the illustrative embodiment.

Referring now to FIG. 11, a mechanical switch 600, also designated S/$\overline{R}$, is located on the main memory data module 174 and it determines whether a fixed identification or the aforementioned identification register designated 602 is used for comparison against the incoming upper address bits numbered six thru thirteen on the main store bus 14 as previously described to select the module for a memory access. The output of the switch 600, is connected by a line 604 to the control input of a multiplexer 606. A register 608 associated with the switch 600 stores the fixed identification. An eight bit output path 610 leads from the register 608 to one input of the multiplexer 606. The input to the identification register 602 is a data input from the supervisory processor 20 as previously described. In particular, the bits numbered fifty six thru sixty three on the main store bus 14 in the present embodiment are conveyed by paths 612 to the register 602. A clock signal for the identification register 602 is applied by line 614. The contents of register 602 are transferred by an eight bit path 616 to the other input of multiplexer 606.

The output of multiplexer 606 is connected by an eight bit path 618 to one input of a comparator 620. The address bits numbered six thru thirteen from the main store bus 14 are transmitted along an eight bit path 622 through a buffer 624 and along another eight bit path 626 to the other input of comparator 620. Thus, if the bit S/$\overline{R}$ on line 604 equals one then the module selection is based on the contents of register 608 associated with the mechanical switch. If S/$\overline{R}$ equals zero then the selection is based on the contents of identification register 602. The identification register 602 is written and read by invoking a particular main store function code designated main store access. Thus, if this particular main memory data module is to be selected for access, that is determined by the comparison of the address bits on path 626 with or against the identification bits on line 618. That is done by comparator 620 to produce a module select signal on the line 628. An enabling signal from the main store controller module 172 is sent along line 630 through buffers 624 and line 632 to multiplexer 620.

Therefore, if all the fixed identification registers 608 on the system memory modules are set uniquely at zero, one, two, . . . N, where N is the maximum number of memory modules minus one, and all the switches 600 are set with S/$\overline{R}$ equal to one, then there exists a sequential address space from low to high memory. If all the switches 600 set with S/$\overline{R}$ equal to zero, then the order of board selection may be used based on programming of the contents of the identification registers 602 by the supervisory processor 20. This is important to diagnostic procedures and to dynamic resource allocation for memory failures.

Signals for reading the contents of the main memory data modules and for clocking foregoing operations are generated in the following manner. The output of the fixed identification register 608 associated with switch 600 is connected by an eight bit path 634 to one input of another comparator 636. The eight bit path 626 also is connected by an eight bit path 638 to the other input of comparator 636. The comparator 636, in turn, is enabled by a signal from the main store controller sent along line 640 through a buffer 642 and then along a line 644 to the comparator 636. The output of comparator 636 is connected by a line 646 to an input of another multiplexer 648. The select signal on line 628 from comparator 620 also is connected by a line 650 to another input of the multiplexer 648. Write and logical zero signals from the main store controller are applied to other inputs of the multiplexer by lines 652 and 654, respectively. A read command signal from the main store controller is transmitted along line 656 through buffers 624 and along lines 658 and 660 to another input of the multiplexer 648. Another logical zero input from the main store controller is applied by a line 662 to the multiplexer. The multiplexer 648 is enabled by a signal from the main store controller transmitted on a line 664 through the buffers 624 and along a line 666 to the multiplexer. One output of the multiplexer 648 is applied by a line 668 to an input of each of the two gates 670 and 672. The other input of gate 670 is connected by a line 674 to another output of multiplexer 648. The output of gate 670 on line 676 is a clock signal sent to the identification register 602. The other input to gate 672 is connected to the line 658, and the output of gate 672 on line 678 is a read command signal.

The output of multiplexer 606 also is applied by an eight bit path 680 to a gate 682. The signal $S/\overline{R}$ indicating the state of switch 600 also is applied by a line 684 to another input of the gate 682. The gate is enabled by a signal on line 686 from the output of multiplexer 648. The eight bit output of gate 682 is sent by an eight bit path 688 to the supervisory processor for diagnostic purposes on the diagnostic bus 24. A one bit path 690 also sends an indication of the state of $S/\overline{R}$ to the supervisory processor.

The memory module contains a plurality of chips collectively designated 700 arranged on the main memory data module. The module or board contains a total of 160 chips, each chip being a 16 K by 1 memory chip, and the chips are arranged in two rows of eighty chips each. In particular, eighty chips are arranged in the upper row and some designated CU0, CU9, CU79 are illustrated in FIG. 11. These are arranged in eight groups of ten bits each. Similarly there is a lower row of eight chips and some designated CL0, CL9, CL70 and CL79 are illustrated in FIG. 11. Data flowing to and from the module is on an eight bit bidirectional path designated 702. The path 702 is connected at one end to path 432 associated with the main store controller, and is connected at the other end to transceivers 704 which, in turn, are controlled by the read control signal on line 678. Two branch paths 706 and 708 connect transceivers 704 to the memory chips on board 700 for data flow to and from the memory chips 700, respectively.

A write enable signal from the main store controller is sent along line 710 through buffers 624 and line 712 to all the memory chips. Another control signal designated CAS from the main store controller enables writing on the write mode and output on the read mode. The signal is transmitted on line 716 through buffers 624 and then through a line 718 to one input of a gate 720, the other input of which is the select signal on line 628. As a result, only one module is accessed, and the output of gate 720 is applied by line 722 to all chips on board 700. An eight bit byte control word on path 724 from the main store controller 172 is sent through the buffers 624 and another eight bit path 726 to one input of a decoder 728. A two bit address signal from the main store controller is transmitted through a path 730, the buffers 624 and a path 732 to the other input of decoder 728. Selection of either the upper or lower row of memory chips is determined by the signals designated RASU, RASL on line 732 which is based on a particular address bit from the main store bus 14. Since the main memory data module is byte addressable, the eight byte control lines represented by path 726 are gated with each RAS signal. The result is sixteen different RAS lines which are connected to the array so that any combination of the eight bytes, each containing ten bits, can be activated in any one of the two rows of chips on board 700. Two of these sixteen lines are designated 734 and 736 in FIG. 11. A seven bit path 714 from the main store controller contains control information which is sent through buffers 624 and a seven bit path 716 to all memory chips.

Figure 12:
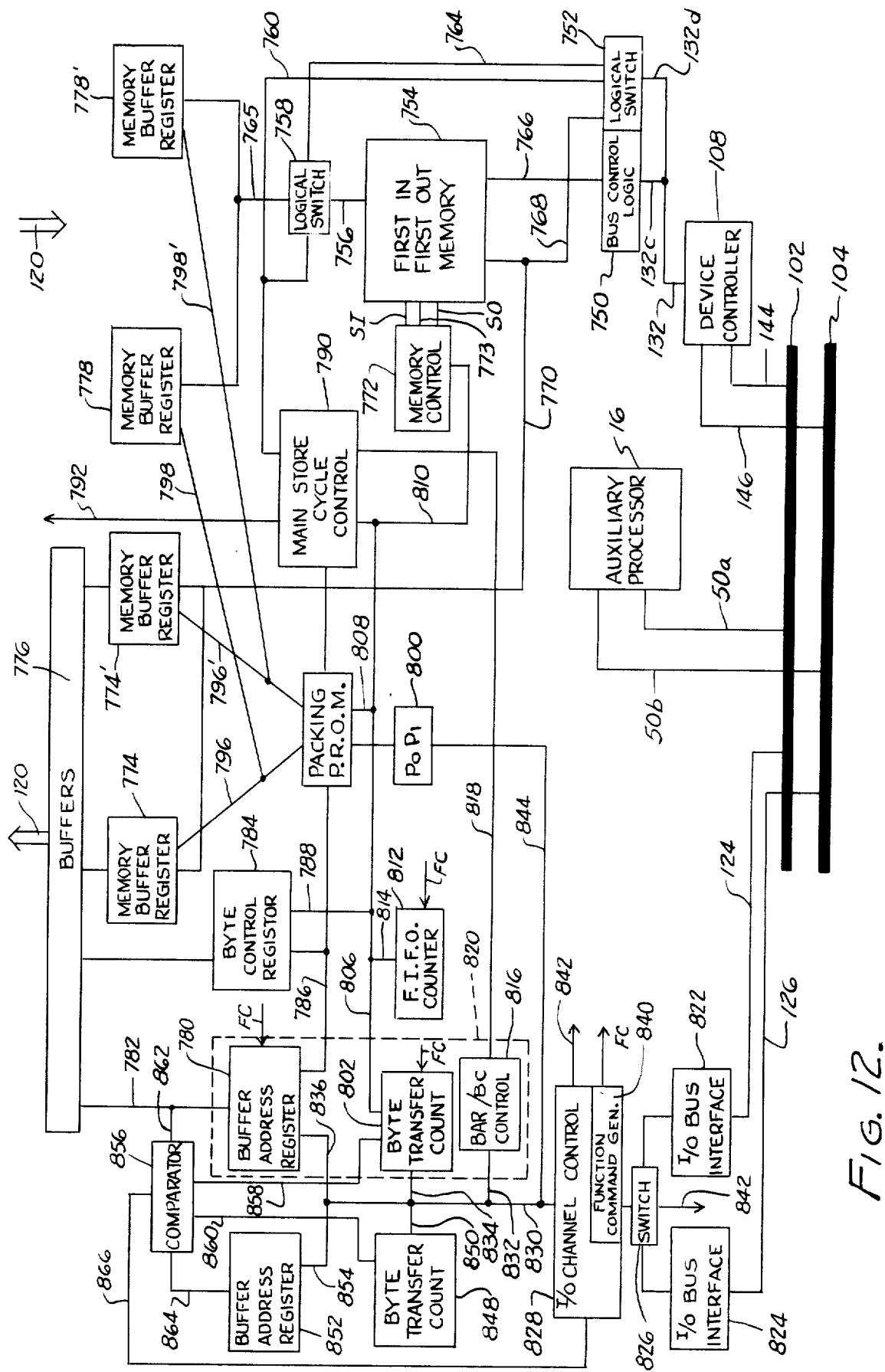
FIG. 12 is a schematic block diagram of a direct memory access controller of the system of FIG. 1

FIG. 12 illustrates in further detail one of the direct memory access controllers in a DMA (direct memory access) channel, for example the controller 30 shown in FIG. 4. The controller includes an interface to the DMA channel including bus control logic 750 and a logical switch 752 for controlling the direction of data transfer. The bus control logic 750 and logical switch 752 are operatively connected to branches 132c and 132d, respectively, of the DMA bus 132, which, in turn, is connected to a device controller, for example device controller 108 shown in FIG. 4. The DMA interface includes nine data bits with parity which travel through logical switch 752 and three control bits which are received in bus control logic 750 after being sent from a device controller 108 which is requesting the DMA controller 30. While device controller 108, auxiliary processor 16 and busses 102,104 are shown in FIG. 12 for purposes of illustration, it is to be understood that they are not part of DMA controller 30.

The DMA controller 30 further comprises an expandable FIFO (first-in first-out) memory 754 having a minimum capacity of sixty four bytes. By way of illustration, the FIFO memory 754 can be of the type commercially available from Monolithic Memories under model no. 6704. A nine bit wide data input path 756 to the FIFO memory 754 receives data from two source paths under control of a logical switch 758 similar to logical switch 752. The logical switches, in turn, are controlled by Read/Write control signals on line 760 depending upon whether the mode of operation is reading or writing the main store. A nine bit wide data path 764 transmits data received from the device controller and DMA bus 132 when the Write signal is present on line 760, and this data passes through logical switch 758 to the FIFO memory input path 756 when the Write signal is on line 760. Data received from the main store, in a manner which will be described, is transmitted by a nine bit data path 765 to logical switch 758 which passes this data on through to path 756 when the Read control signal is on line 760. Bits from the bus control logic 750 are applied by a path 766 to the FIFO memory 754 where they are decoded for control and identification purposes. Data words at the output of the FIFO memory 754 leave through a nine bit wide path having a first branch 768 leading to the logical switch 752 and a second branch 770 leading to a main store interface. A memory control 772 is operatively connected to FIFO memory 754 and will be described in further detail presently.

The DMA controller 30 further comprises a main store interface including a first set of memory buffer registers 774,774' for providing a data output to the main store. Each of the memory buffer registers 774 for example contains nine bits, and usually eight such registers are included in a typical DMA controller 30 although only the two registers 774 and 774' are shown in FIG. 12 for convenience. The nine bit wide path 770 from the output of the FIFO memory 754 is connected to each register 774,774' etc. of the register set. All of the registers, in turn, are connected through buffers generally designated 776 to bus 120 which is an extension of the main store bus 14 as shown in FIG. 4. Similarly, another set of registers 778,778' receive data read from the main memory which is transmitted along bus 120. These registers are similar to the registers 774, that is each containing nine bits and there being a total of eight such registers. The contents of these registers are transferred to the nine bit path 765 leading to logical switch 758 and ultimately to the input of the FIFO memory 754. The main store interface thus includes seventy two data bits in the illustrative example.

The main store interface further comprises a buffer address register designated 780 which can contain 32 address bits and parity bits. The contents of the buffer address register 780 register are transferred by a path 782 through the buffers 776 to the bus 120 and ultimately to the main store 12. The main store interface also includes a byte control register 784 which serves as an addressable latch. The three least significant bits of the address stored in buffer address register 780, also designated byte pointer bits, are transmitted by a path 786 to control the byte control register 784. Other controls for byte control register 784 come from path 788 in a manner which will be described. The contents of byte control register 784 are transferred by a path 790 through buffers 776 to the bus 120. There is also provided a main store cycle control designated 790 which includes a number of registers and associated logic. A number of control lines collectively designated 792 are connected to control lines on the main store bus 14. One of the registers in the main store cycle control 790 contains the read/write bit which is decoded and provides a signal on line 760 leading from main store cycle control 790 to switch 758. Other registers in the main store cycle control 790 store bits sent from the auxiliary processors 16 and containing information for selection of a function module in the intelligent main store 12, identification codes and protect keys. These bits are received by main store cycle control 790 over paths which will be described.

The DMA controller 30 further comprises byte packing logic which is provided by a packing PROM (programmable read only memory) 794 in conjunction with a portion of the previously described byte control register 784. The primary function of the byte packing logic is to control the manner in which the data bytes are arranged in or removed from the registers 774,774' and arranged or removed from the registers 778,778'. The packing PROM 794 provides output control signals on lines connected to all of the main store interface registers 774,774' and 778,778'. In particular, load enable signals are connected by lines 796 and 796' to the registers 774 and 774' and similarly read enable signals by lines 798 and 798' to the registers 778 and 778'. A register 800 for storing bits designated $P_0P_1$ is connected to the packing PROM 794 for a purpose to be described.

The DMA controller 30 further comprises a plurality of channel control registers. One of these is the buffer address register 780 previously described. There is also provided a byte transfer count register 802 which provides an indication of the byte count being decremented to zero through a line included in the path designated 806, the other end of which is connected to the main store cycle 790. As shown in FIG. 12, signals in the path 788 leading to byte control register 784 are connected to path 806 and a path 808 leading from the packing PROM 794. Path 806 also is connected by a path 810 to the FIFO memory control 772. A FIFO counter 812 is connected through a path 814 to path 806. A BAR/BC (buffer address register/byte count) control designated 816 is connected by a path 818 to the main store cycle control 790. By way of further illustration, the buffer address register 780, byte transfer count register 802 and BAR/BC control 816 comprise a subsystem designated 820 in FIG. 12 which is available commercially as a set of integrated circuits from Advanced Micro Devices under model no. 2940.

The DMA controller 30 further comprises an input-output channel interface. In particular, an interface unit 822 is connected to the extension 124 of the input-output bus 102 as shown in FIG. 4, and an interface unit 824 is connected to the extension 126 of input-output bus 104. The interface units 822 and 824 are connected through respective paths as shown in FIG. 12 under control of a logical switch 826 to the input of an input-/output channel control 828, the output of which is connected to a single path 830. Path 830, in turn, is connected by branch paths 832, 834 and 836 to the BAR/BC control 816, byte transfer register 802 and buffer address register 780. The input/output channel control 828 contains logic enabling a device controller to be connected to an I/O channel. A function command generator designated 840 is a part of the I/O channel control 828 and comprises the combination of a counter and decoder. Output signals from generator 840, in particular from the decoder thereof, are designated FC and are connected to various components of the DMA controller 30 as shown in FIG. 12.

The DMA controller 30 of the present invention also comprises a duplicate byte transfer count register 848 connected to path 830 by a branch path 850 and a duplicate buffer address register 852 connected by a branch path 854 to path 830. There is also provided a comparator 856 for comparing the contents of the duplicate registers. The state of the duplicate byte transfer count registers 802 and 848 are transferred by paths 858 and 860, respectively, to inputs of the comparator 856. The contents of the duplicate buffer address registers 780 and 852 are transferred by paths 862 and 864, respectively, to other inputs of the comparator 856. When there is a difference between the contents of registers 802 and 848 or between the registers 780 and 852 or both, comparator 856 provides a signal on lines 866 which is utilized to cause the auxiliary processor 16 to stop the transfer. The registers 802 and 780 are loaded from one auxiliary processor, for example processor 16, and the registers 848 and 852 are loaded independently from the other auxiliary processors 16'. Each auxiliary processor 16 computes the data to be loaded into the registers independently of one another. Comparing the one set of registers against the other and issuing a command to stop the transfer if the register contents are different as described above insures that no errors occur.

In operation, when it is desired to write data into the main store 12, the device controller sending the data requests the DMA controller 30 by means of control bits sent to bus control logic 750 and then to FIFO memory 754. The write signal sent from the auxiliary processor 16 is on lines 760 and 762 causing logical switches 752 and 758 to allow data from the DMA bus to flow through paths 764 and 756 into the FIFO memory 754. The data goes into FIFO memory 754 in nine bit bytes under control of the memory control 772 which keeps track of the amount of data going in, stored in and leaving from the FIFO memory 754. The nine bit bytes leave FIFO memory 754 and are transmitted to the memory buffer registers 774,774'. The order in which the bytes are placed in the memory buffer register, i.e. normal packing, reverse packing, every two bytes reversed, reversed and every two bytes reversed is controlled by the packing PROM 794. During the main store writing mode the information stored in byte control register 784 tells which of the memory buffer registers 774 and 774' contains valid data. When all the registers 774 and 774' are filled, the contents are transferred through buffers to DMA bus 120 and then through main store bus 14 to a storage location in the main store, the address of which is contained in buffer address register 780 and which is also transferred to the main store controller via the main store bus 14. The information and controls from the main store cycle control 790 also are transferred to the main store controller. The number of bytes transferred to the main store 12 is controlled by the count stored in byte transfer count register 802. The auxiliary contents of registers 780, 802 were supplied from the processor 16. When the byte transfer count becomes zero, indicating the end of the transfer, an indication of such can be transmitted over path 806 to path 810 and to memory control 772.

Providing the FIFO memory 754 in the DMA controller 30 gives the auxiliary processor 16 time to respond when an intervention, such as data chaining, is required. For example, during a transfer of data to a block of addresses in main store 12, there may arise a need to intervene and transfer the data from the device controller 108 to a different main store location. The presence of the FIFO memory 754 which receives the data from the main store 12 gives the auxiliary processor 16 sufficient time to respond to this intervention need. FIFO counter 812 tells how much data remains in FIFO memory 754 at any time and is a useful status indicatior.

When it is desired to read the main store 12 and transfer the data read to a device controller 108, the address from which data is to be read is sent to the buffer address register 780 from the auxiliary processor 16 which also sends the byte count information to register 802. The device controller 108 which is to receive the data sends control bits to bus control logic 750 and then to FIFO memory 754. The read signal sent from the auxiliary processor 16 is on line 760 causing switches 758 and 752 to allow data from path 765 to flow into FIFO memory 754 along path 756 and then out of memory 754 along path 768 to DMA bus 132 and then to the requesting device controller 108. The data read from main store 12 in response to appropriate commands flows along bus 120 into the memory interface registers 778,778'. The order in which the contents of the registers are transmitted along path 765 is controlled by the packing PROM 794 in a manner similar to that for a write operation. The number of bytes read from main store 12 and transferred to registers 778,778' is controlled by the count stored in register 802 in a manner similar to that of the write mode.

A further detailed description of the foregoing operation in the context of the system input-output operation is as follows: An auxiliary processor 16 decides which d.m.a. channel will be connected to a particular device controller 108, and the auxiliary processor 16 connects to the DMA controlller 30 by means of the input-output channel using the connection procedure previously described. Then the auxiliary processor 16 proceeds to start loading functions into the DMA controller 30. In particular, functions which are device dependent and intended to control the direct memory access transfer are loaded into the counter of the function generator 840 and the output of the counter is decoded to provide load enables for the registers. The registers are loaded with the information needed for the main store transfers. Data is loaded in the following order: first the buffer address register 780 and byte count register 802, next a main store interface control register within the main store cycle control 790, next a protect key register within main store cycle control 790, next a thirty two bit quantity to the buffer address register 780 and finally a sixteen bit quantity to the byte transfer count register 802. The foregoing data loading procedure is illustrated in Tables I and II as follows:

TABLE I (a) the BAR and BC control register

Control Register

| $P_0$ | $P_1$ | | | $CR_2$ | $CR_1$ | $CR_0$ |
|---|---|---|---|---|---|---|

| $CR_1$ | $CR_0$ | Control Mode Number | Control Mode Type | Word Counter | Done Output Signal |
|---|---|---|---|---|---|
| L | L | 0 | Word Count Equals One | Decrement | HIGH when Word Counter = 1 |
| L | H | 1 | Word Count Compare | Increment | HIGH when Word Counter + 1 equals Word Count Register |
| H | L | 2 | Address Compare | Hold | HIGH when Word Counter + Address Counter |
| H | H | 3 | Word Counter Carry out | Increment | Always LOW. |

$CR_2$  Address Counter
L  Increment
H  Decrement

H = HIGH
L = LOW
Word = Byte

TABLE II

| Packing Control: | | | |
|---|---|---|---|
| $P_0$ | $P_1$ | Meaning | Example |
| 0 | 0 | Normal packing | 01234567 |
| 0 | 1 | Reverse packing | 76543210 |
| 1 | 0 | Every 2 bytes reversed | 10325476 |
| 1 | 1 | Reversed and every 2 bytes reversed | 67452301 |

(b) main store interface control register

| R/W | $ID_0$ | $ID_1$ | $ID_2$ | $ID_3$ | $F_1$ | $F_2$ |
|---|---|---|---|---|---|---|

R/W = 1  READ MAIN STORE
    = 0  WRITE MAIN STORE
$ID_0$–$ID_3$  a four bit ID code which may be the ID of the AP, could be used for diagnostic information if main store bus hangs.
$F_1F_2$  a code telling which of the main store interface cards to use in accessing main store (i.e. IBM 370, . . . etc.) allows selection of different protection schemes.

TABLE II-continued

Packing Control:

base registers, and other emulation
dependent main store modifiers.

(c) protect key register

| SUPR | DCH | KYEN | KY$_1$ | KY$_2$ | KY$_3$ | KY$_4$ |
|------|-----|------|--------|--------|--------|--------|

| | | |
|---|---|---|
| | SUPR | suppress data transfer to/from M.S. |
| | DCH | data chaining |
| | KYEN | enable the protect key mechanism |
| | KY$_1$-KY$_4$ | a four bit protect key |
| (d) | BAR | a 32 bit quantity, loaded 8 bits at a time, most significant byte first |
| (e) | BC | a 16 bit quantity, loaded 8 bits at a time, most significant byte first |

The function command generator 840 comprising counter and the decoder also feeds address inputs to the P$_0$P$_1$ register 800 connected to the packing PROM 794. The function command generator 840 also provides the controls on lines FC connected to the various components as shown in FIG. 12.

The auxiliary processor 16 may load a function command and put the function command generator 840 in an auto increment mode. This allows the auxiliary processor 16 to send a sequence of parameters to the DMA controller 30 without reloading the function command generator 840 each time to tell the DMA controller where the data is going.

The subsystem designated 820 in FIG. 12 is provided with clock signals from the input-output channel when it is being loaded with parameters and it is provided with clock pulses from another source when it is controlling the address and word count of a direct memory access transfer since then it must increment on each direct memory access byte transfer. This latter source is controlled by a bit from the packing PROM 794 which gates one of the signals as the clock.

After the registers listed in Tables I and II hereinabove are loaded with information needed for the main store transfers, the auxiliary processor 16 must send a command to connect a DMA controller to a particular direct memory access bus. At this point the DMA controller 30 is ready to transfer data to or from the device controller 108 that is connected to the other end of the DMA bus 132. The auxiliary processor 16 then must connect to the device controller 108, set up any necessary parameters and send a start input-output command to the device controller.

When a device controller, for example controller 108 in FIG. 4, is ready to send or receive data it asserts the control signal BREQ on the DMA bus 132. If the device controller 108 is sending data to the DMA controller 30 the data must be stable on the data line when the BREQ signal is asserted and the data must be held back until the control signal BREQACK is received from the DMA controller 30. If the DMA controller 30 is sending data to the device controller 108, the data will be stable when the signal BREQACK is asserted and will be held until the device controller 108 removes the BREQ signal.

As each byte is transferred between the FIFO memory 754 and the main store 12, in either direction, the byte transfer count register 802 is updated. The buffer address register 780 is updated at the same time as the byte transfer count register 802. In order to keep the buffer address register 780 set up properly for main store transfers, the updating of the buffer address register 780 and byte transfer count register 802 must be handled specially when the transfer is from the DMA controller 30 to main store 12. The registers 780 and 802 are normally updated when the data is transferred from the FIFO memory 754 to the memory buffer registers 774,774'. However, the update is postponed until after the main store transfer on the last byte to be loaded into the registers 774,774' before the main store request. The buffer address register 780 and byte transfer count register 802 will then be proper.

A seperate control line WCONE is asserted by the DMA controller 30 along with the transfer of the last byte of data between the DMA controller 30 and device controller 108. On transfers to the DMA controller 30 from the device controller 108 the WCONE signal is synchronized with the BREQ and sent to the device controller 108 when it occurs. In this case the DMA controller 30 also maintains a status bit which indicates that all transfers to main store 12 are complete, but data is still left in the FIFO memory 754. On transfers from the DMA controller 30 to the device controller 108 the WCONE signal is stored in the FIFO memory 754 along with the last byte of data so that the device controller 108 receives the WCONE signal simultaneously with the last data byte.

If the data chaining control bit is set, that bit being stored in the protect key register of the main store control 790, the DMA controller 30 does not assert WCONE but instead generates a status interrupt to the auxiliary processor 16 requesting new buffer address register 780 and byte transfer count register 802 information. This data chaining interrupt is generated immediately upon the occurance of byte transfer count zero. The amount of time the auxiliary processor 16 has to respond is directly related to the capacity of the FIFO memory 754 and inversely related to the transfer rate of the device controller 108. The DMA controller 30 stops transferring data to main store 12 after the data chaining interrupt. After the last byte of the byte transfer count register 802 has been loaded, the DMA controller is again enabled to transfer data to/from main store 12. If the FIFO memory 754 is full/empty while the data chaining interrupt is waiting to be serviced, the data transfer to/from the device controller 108 is held up by not responding to the BREQ signal with a BRQACK signal. If the device controller 108 has to transfer another byte of data to/from the DMA controller 30 before the DMA controller 30 has responded to the last request for service, an overrun condition exists and a status interrupt will be sent to the auxiliary processor 16 by the device controller 108.

At the end of a data transfer, when the byte transfer count in register 802 equals zero the FIFO memory 754 and memory buffer registers 774,778 are empty, the DMA controller 30 will alert the auxiliary processor 16 of its not busy status via a status interrupt. The device controller 108 will also give the auxiliary processor 16 a not busy interrupt when it finished. On transfers from the device controller 108 to the DMA controller 30, if the device controller 108 issues device end before the DMA generates byte transfer count zero, the auxiliary processor 16 must send a channel end command to the DMA controller 30. This command indicates to the DMA controller that if the FIFO memory 754 becomes empty before the byte transfer count register 802 becomes zero the DMA controller 30 must generate channel end and if necessary force the transfer of the rest of the data to main store 12 as if the byte transfer count register 802 had become zero.

When a main store request interrupt condition is honored, a double word plus byte parity bits will be strobed to or read from the memory buffer registers 774 and 778 depending upon the condition of the read/write bit which previously was set up by the auxiliary processor 16. If a read main store condition is indicated the information from the main store bus 14 is clocked into the memory buffer registers 778. If a write main store is indicated the output of registers 774 will be enabled to the main store bus 14 on the signal from that bus.

The FIFO memory 754 is uni-directional so that if the main store 12 is being read, the output of the registers 778 is enabled as the input to the FIFO memory 754. When writing to the main store 12 the outputs of the logical switch 752 on the DMA channel are enabled to the input of the FIFO memory 754. The output of FIFO memory 754 is either an input to the logical switch 752 when the main store 12 is being read or an output to the memory buffer registers 774 which will be transferred to the main store 12 on a write cycle.

The following occurs during the mode of operation for reading main store 12. A shift in signal designated SI in FIG. 12 is sent to the FIFO memory 754 from the memory control 772 when the FIFO memory 754 asserts an in ready condition indicating that there is room at the input of the FIFO memory. The SI signal will be inhibited if any number of other conditions are asserted. The actual inhibiting can be done by the memory control 772. For example, the SI signal will be stopped if the memory buffer registers 778 are empty, i.e. if all the data has been read from the registers 778. The buffer empty or register empty condition is known when the last valid byte is shifted from the memory buffer registers 778 to the FIFO memory 754. The last byte is flagged by a byte in the packing PROM 794. In particular, packing PROM 794 picks off the bytes in the memory buffer registers 778 in the order indicated by the auxiliary processor 16 in the packing control. When the enable for the last bytes in a particular packing sequence comes up the last byte flag also comes up. Then when the byte is shifted into the FIFO memory 754 with the last byte asserted, the buffer is known to be empty. The foregoing condition could also create a request to the main store bus 14 for more data, provided the byte transfercount in register 802 has not become zero indicating the end of data requests.

Another condition inhibiting the SI signal is when the byte transfer count contained in register 802 goes to zero. That occurs when the last word of the DMA transfer goes from the memory buffer register 778 into the FIFO memory 754. This can be indicated by a DONE signal over path 810 when the number of increments of the byte transfer counter 802 equals the count loaded into the subsystem 820 by the auxiliary processor 16 at the initialization of the DMA transfer.

Assuming that none of the foregoing conditions occurs to inhibit the SI signal, once it is received by the FIFO memory 754 and the FIFO memory 754 is in the ready condition the FIFO memory 754 will receive the bytes as inputs. During the main store reading mode, which is also the mode of writing into a peripheral device, data flows from the FIFO memory 754 to the output thereof. Data leaves the FIFO memory 754 in response to a shift out signal designated SO in FIG. 12. When the shift out signal SO is sent by the memory control 772, this causes an acknowledgement signal to be sent to the DMA channel. That signal is reset when the BREQ signal is turned off. If a byte marked with an error bit comes out of the FIFO memory 754, the acknowledgement is inhibited. Because of the error, a DONE signal is sent to the device controller 108 when the DMAWC signal appears.

In the other mode of operation, when data is sent by the device and is to be written into the main store 12, the shift in and shift out signals are provided in response to different conditions. During the main store write mode, the device controller 108 will signal that it has a byte of data by asserting the BREQ signal. If the input of the FIFO memory 754 is ready, the presence of the BREQ signal will cause the memory to shift in the byte and to provide an In Ready signal. When the In Ready signal goes off in response to the SI signal, that causes an acknowledgement signal to be sent to the device controller 108. The acknowledge signal is reset when the BREQ signal disappears.

The shift out condition for this situation where data goes from the device controller 108 to the main store 12 is similar to the shift in condition in the opposite direction. The SO signal causes data to be put into the memory buffer registers 774,774' enabled by the packing PROM 794 when the FIFO memory 754 signals an out ready condition. The out ready condition signalled by FIFO memory 754 indicates that there is data at the output of FIFO memory 754 ready to be transferred.

The shift out of data from the FIFO memory 754 to the memory buffer register 774,774' can be inhibited for a number of reasons. One reason the shift out condition is inhibited is the memory buffer registers 774,774' being full. This is indicated when a byte flagged with a last byte flag is shifted out of the FIFO memory 754 into the buffer registers 774,774'. The SO signal also is inhibited when the byte transfer count stored in register 802 goes to zero. The final byte of the transfer is flagged on a signal from the subsystem 820 over path 806. As a result, when the byte with the final byte flag is clocked by an SO signal, further SO signals will be inhibited. If a transfer from the FIFO memory 754 to the main store 12 does not occur for the reason that the main store controller found an error, further shifts into the memory buffer registers 774,774' are inhibited when the error bytes are returned at the end of the main store transfer.

Assuming that SO is not inhibited and data is sent from the FIFO memory 754 to the memory buffer registers 774,774', each byte is transferred one at a time. The three least significant bits of the buffer address register 780 are sent along path 786 to the packing PROM 794 and the byte control register 784. The packing PROM output enables the transfer of one of the bytes to one of the memory buffer registers 774,774'. The byte control register 784 supplies a three bit code which addresses one of eight latches in the byte control register 784. The latch is strobed as each byte is transferred to the memory buffer registers 774,774'. In this way it will contain a bit in every position that a valid byte is in the memory buffer registers 774,774'. The latches are reset after the transfer to the main store bus 14. All the required information will be strobed to the main store bus 14 during the transfer.

The parity on all the bytes transferred into the FIFO memory 754 is checked. If a parity error occurs an error bit is sent through the FIFO memory 754 with an error word. A word which is marked with an error bit is not loaded into the memory buffer registers 774,774'. This is accomplished by having the parity error bit inhibit the SO signal. Similarly any errors flagged by the main store controller are loaded into one of the memory buffer registers 778,778' at the end of a main store transfer. After a byte from the register containing the main store error is shifted into the FIFO memory 754 the error will inhibit any additional SI signals until cleared. The byte which went into the FIFO memory 754 is marked by an error bit.

A device controller 108 can signal a "done" condition by asserting the DMACA signal through bus control logic 750 and path 766. This indication is passed through the FIFO memory 754 with the byte in question. When that byte is strobed into the memory buffer registers 774,774', the "done" condition indication, received from the channel, causes a flip-flop (not shown) to go to a state inhibiting the out ready condition thereby preventing any further shift out of the FIFO memory 754.

A main store request is sent under two conditions. When the last memory buffer register 774 is loaded during the main store write mode or when the last memory buffer register 778 is emptied during a read mode, provided the byte transfer count doesn't go to zero at the same time, a main store request is sent. A main store request also is sent during the main store write mode when the final byte previously transferred from the device controller 108 is shifted out of the FIFO memory 754. This byte was marked when the device controller 108 asserted the DMAWC signal. When the byte transfer count is one and its associated byte is strobed into the memory buffer registers 774,774', meaning that the DMA transfer is over, a request is sent to transfer the final bytes into the main store 12.

When data is transmitted over the DMA channel to the device controller 108, the particular channel is predetermined by the auxiliary processor 16. The channel which is active is controlled by decoding the DMA channel select register in the bus control logic 750. The select register is programmable by the auxiliary processor 16 by sending the function indicating to load that register followed by the data going into it. The enable of either the set of receivers or the set of drivers in the logical switch 752 is determined by the read/write information, supplied from the auxiliary processor 16. An acknowledge signal goes out in both cases and the BREQ signal is received in both cases.

Figure 13:
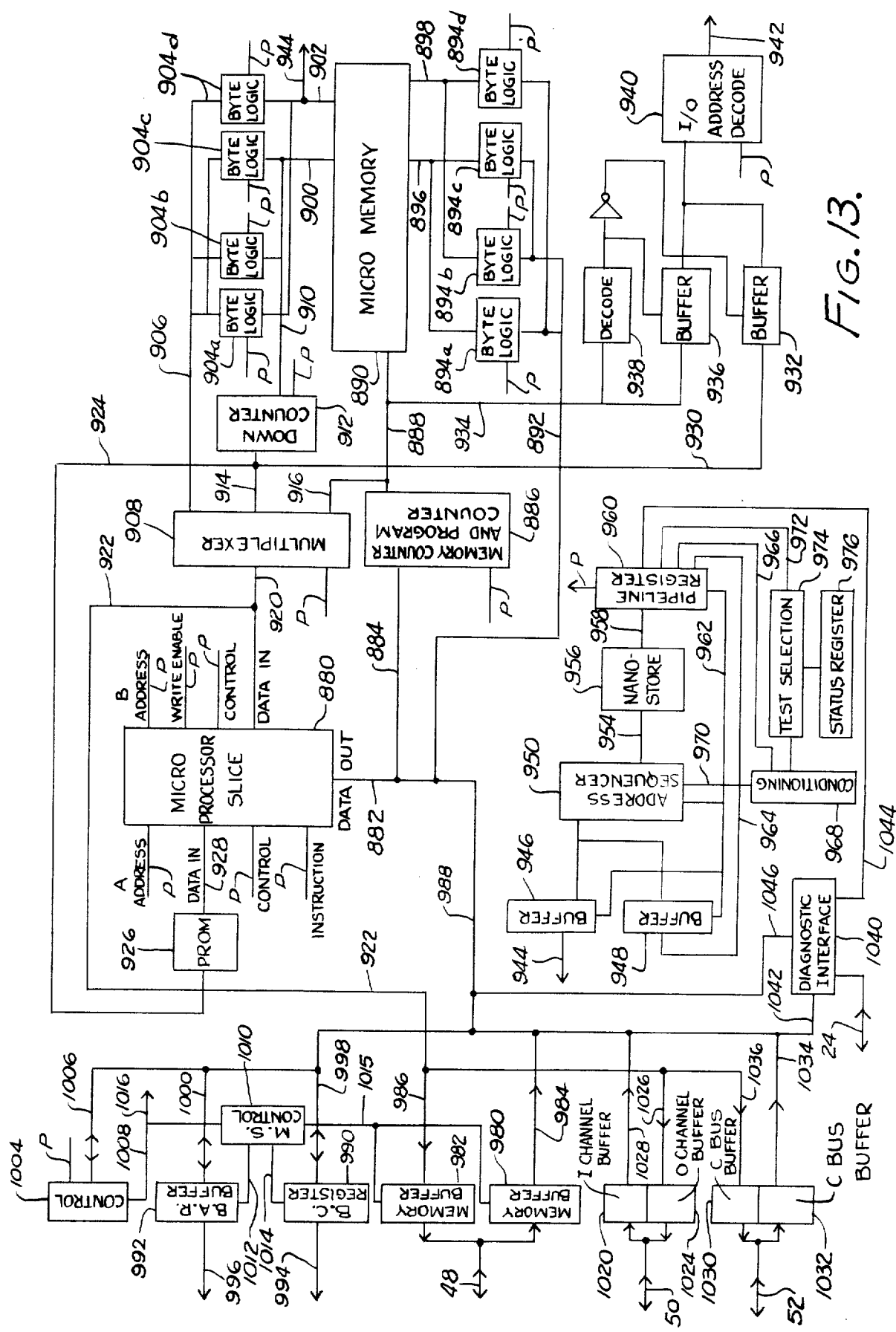
FIG. 13 is a schematic block diagram of an auxiliary processor of the system of FIG. 1.

FIG. 13 shows in further detail one of the auxiliary processors 16 in the system of FIG. 1. The auxiliary processor includes a microprocessor generally designated 880, which, by way of example, can consist of a combination of four devices commercially available from Advanced Micro Devices under the designation Am2903. The device shown in FIG. 13 represents four 4 bit microprocessor slices employed in a stacked arrangement to give a total capacity of 16 bits. The four components are interconnected and the entire combination is connected to other parts of the auxiliary processor 16 in a manner which will be described.

Each microprocessor slice contains a 16 word by 4 bit, two port random access memory, RAM, with latches on both output ports, a high performance arithmetic logic unit and shifter, a multipurpose Q register with shifter input and a nine bit instruction decoder. The details of the interconnection of the above units within device 880 are available in literature available from AMD. The A and B address inputs shown in FIG. 12 control the reading and writing of the two port RAM. Data can be entered into device 880 via paths 920 and 928 and data can be read from the device via paths 882 or 920.

The data output of the microprocessor slice 880, in particular a path 882 leading from the ALU shifter is connected by a branch path 884 to the input of an addressing means generally designated 886 for a memory of the auxiliary processor 16. The addressing means 886 includes two sixteen bit counters, one designated the memory counter and the other designated the program counter. There are three operations which can be performed on these registers. The first is to load either register, both registers or neither register. The second operation is selecting one of the registers as the memory address, and this operation is independent of loading the register. The third operation involves incrementing the register chosen as the memory address. The counting function provided by the addressing means 886 allows incrementing of addresses without using the microprocessor slice 880 for that task. The generated address output is present on path 888 and applied to the address input of an auxiliary processor memory 890, also identified as the microprocessor memory. By way of illustration, the micro memory 890 stores sixteen bit words plus parity and is expandable in 4K word increments to 120K bytes. The memory has a seventy nanosecond cycle time, and the address is a word address. The micro memory 890 contains both instructions and data, and instructions are executed from the micro memory 890.

The data input for the micro memory 890 is transmitted along a path designated 892 in FIG. 13. This path is divided into four branches each containing the byte logic circuits 894a-d, respectively, which serve to interchange or shift the data bytes when desired. One reason for this is that the micro memory 890 is not byte addressable. Furthermore, the capability of shifting the bytes before the data enters the micro memory 890 is useful in such things as character transfers. Data enters the micromemory 890 through the paths 896 and 898. The data read out from the memory 890 is present on the two paths 900 and 902 which, in turn, become four branch paths each containing byte logic circuits 904a-d, respectively, similar to the byte logic circuits 894a-d at the memory input. This permits swapping or interchanging of the bytes in the data output.

The outputs of the byte logic circuits 904a-d are transmitted along a single 16 bit path 906 to one input of a 16 bit, three way multiplexer 908. The data on one of the paths leading from the memory, in particular path 900, is connected by a path 910 to the input of an eight bit down counter 912 which serves to provide input-output addresses. It also serves as a loop counter when loaded with a constant from the micro memory 890. The output of down counter 912 is applied through an eight bit data path 914 to another input of the multiplexer 908. The address bits on path leading from addressing means 886 are connected by an eight bit path 916 path to a third input of the multiplexer 908. The multiplexer 908 provides a 16 bit output selected from any one of the three input data paths 906,914 and 916. The 16 bit output path 920 of the multiplexer 908 is divided into four seperate 4 bit outputs each applied to corresponding inputs of the four microprocessor slices. As shown in FIG. 13, a four bit path leads from path 920 to the data input of each microprocessor slice 880. The 16 bits from path 920 are applied by a path 922 to another portion of the system in a manner which will be described.

The eight bit output of the down counter 912 also is applied by a path 924 as an address input to a PROM (programmable read only memory) designated 926. The 16 bit output of PROM 926 is divided into four corresponding four bits outputs applied to respective microproccessor slices. This group of four 4 bit paths is generally designated 928 connecting PROM 926 and microprocessor 880. The PROM 926 generates patterns as a function of the output of the down counter 912, and it is used in such operations as bit masking, generation of constants, and test of bits.

The eight bit output of the counter 912 also is transmitted along a path 930 to components for generating addresses for selecting registers in another portion of the auxiliary processor 16, that portion to be described presently. In particular, path 930 is connected to the input of a buffer 932, and the path 888 containing addresses for the micro memory 890 also is connected by a branch path 934 to antoher buffer 936 and to a decoder 938. The output of the decoder 938 is connected in controlling relation to the two buffers 932 and 936 as shown in FIG. 13, and the contents of the two buffers 932 and 936 are conbined into a single input for an input-output address decoder designated 940. The output 942 of this decoder contains the addresses for selecting registers in another portion of the auxiliary processor 16 and is connected thereto in a manner which will be described.

The auxiliary processor 16 is programmable on two levels, one of which involves instructions from the micro memory 890, the other of which involves an instruction set obtained from a control portion of the auxiliary processor 16. This level is the lower level and provides a mapping from the operation codes of the instructions coming from micro memory 890 to various function and control lines in the system. The control portion receives words from the micro memory 890 on path 944 connected to the input of a three state buffer 946. The control portion also includes another three state buffer 948, and the contents of the two buffers 946 and 948 are combined and applied to the data input of an address sequencer 950. By way of illustration, address sequencer 950 can be a microprogram controller commercially available from Advanced Micro Devices under model no. AM2910. Output words from address sequencer 950 are applied through a path 954 to the address input of a memory 956, designated a nanostore. The nanostore 956 has the capability to contain up to 1024 words each fifty six bits in width and has a cycle time of sixty nanoseconds. Thus, the address sequencer 950 controls the sequence of execution of microinstructions stored in the nanostore 956. The words selected from nanostore 956 are transmitted through a path 958 to a pipline register 960. The pipeline register 960 is provided to contain the bits which provide control signals for the other functional portions of the auxiliary processor 16. Providing the pipeline register 960 enables the commands to be stacked up and allows one command to be fetched before execution of a previously received command is finished. Control bits from the output of the pipeline register 960 are present on a line designated P. This same line is applied to other components of the system to provide controls as shown as in FIG. 13. Additional control bits from register 960 are transmitted by a path 962 to the address input of address sequencer 950 and to the control inputs of buffers 946 and 948. Other control bits from pipeline register 960 are sent along a path 964 to the input of the three state buffer 948. Additional control bits from pipeline register 960 are transmitted by a path 966 to one input of a condition code circuit 968, the output of which is connected by line 970 to a control input of address sequencer 950. Other control bits from register 960 are transmitted by a path 972 to the input of the test selection logic circuit 974, the output of which is connected to another input of the conditioning code circuit 968. A status register 976 receives signals from other portions of the system, such as main store 12, communications bus 22, the input-output portion of the system, etc. The contents of register 976 are transferred along a path 978 to the test selection circuit 974. The test selection circuit 974 includes logic which selects input conditions from information contained in status register 976, and the conditioning code circuit 968 provides a transformation in the form of complementing the test selection bit.

The auxiliary processor 16 further includes components for interfacing with the main store 12, a DMA controller 30, the input-output bus ensemble 28, and the communication bus 22. The memory interface includes a pair of 72 bit buffer registers 980 and 982, one for each direction, connected through the bidirectional path 48 to the main store bus 14. Thus path 48, which contains 72 bits plus parity bits, is separated into a first branch for conveying bits into register 980 and a second branch for receiving bits from the other register 982. The registers 980 and 982, in turn, are connected to nine bit paths 984 and 986, respectively, and the directions of the paths are indicated by the arrows in FIG. 13. Path 984 is connected through a 16 bit branch path 988 to the output path 882 from the microprocessor slices, and path 986 is connected to the 16 bit path 922 leading from the output of the multiplexer 908. The main store interface also includes a buffer to the direct memory access controller 30 including a first register 990 for storing the 16 bit byte count and a second register 992 for storing the 32 bit buffer address word. The output of register 992 is connected through a 32 plus parity bit path 996 to the main store bus 14. The registers 990 and 992 are connected by the bidirectional paths 998 and 1000, respectively, to the path 988 from the microprocessor slices. Associated with this portion of the interface is a control circuit 1004 for the byte packing in the interface which includes a 16 bit wide bidirectional output path 1006 which also is connected to the 16 bit path 988 from the microprocessor slices. The control output of circuit 1004 is connected by a path 1008 to a main store control circuit 1010 which controls setting memory requests, loading buffers 980 and 982, etc. Two outputs of circuit 1010 are connected by paths 1012 and 1014 to the registers 992 and 990, respectively, for controlling incrementing of those registers. Another output of circuit 1010 is connected by line 1015 to buffers 980, 982 for controlling loading of same. The output of control circuit 1004 also is connected by a path designated 1016 to the other registers of the interface.

The input-output channel interface includes a pair of buffer registers 1020 and 1024 connected through the bidirectional nine bit plus parity input-output channel path 50 to the I/O bus ensemble 28. Register 1024 is connected by a nine bit path 1026 to the 16 bit path 922 leading from the multiplexer 908, and register 1020 is connected by a nine bit path 1028 to the 16 bit path 988 from the microprocessor slice and via path 892 to micro memory 890. Finally, the communication bus interface includes a pair of registers 1030, 1032 connected through the bidirectional path 52 to communication bus 22. This provides communication with the other auxiliary processors 16 as well as the execution processors 18. Register 1032 is connected through a 16 bit path 1034 to the path 988 from the microprocessor slice and then via path 892 to micromemory 890 and register 1030 is connected by a 16 bit path 1036 to the path 922 from multiplexer 908.

The auxiliary processor 16 finally includes a diagnostic interface logic circuit designated 1040. One input to the circuit is connected by a path 1042 to the 16 bit path 922 leading from the multiplexer 908. Another input of circuit 1040 is connected to the diagnostic bus 24 and, accordingly, to the supervisory processor 20. A third input is connected to a path 1044 for receiving the entire contents of pipeline register 960. The output of the diagnostic interface 1040 is connected by a path 1046 to the 16 bit path 988 connected to the micro processor slice and to the path 892 connected to micromemory 890. The diagnostic interface 1040 contains control logic which allows the supervisory processor 20 to take control of the auxiliary processor 16 by disabling control signals, registers, etc. of the auxiliary processor 16 and introducing diagnostic and supervisory signals from the supervisory processor 20.

In operation, the micro memory 890 contains the microcode by means of which the auxiliary processor 16 implements the various operations performed in the context of the overall system operation as previously explained. This would include, for example, control of the chanael, main store port and some input-output devices as well as emulating input-output devices. Data and address information such as requests for service, data to be processed and new words to be stored in memory 890 are received through the appropriate buffer or interface and transmitted along path 988 and ultimately separated into address and data inputs to micromemory 890. The memory 890 and microprocessor slice 880 co-operate to generate instructions, identification codes and similar quantities which are conveyed along path 922 to the appropriate interface and ultimately to the appropriate component of the system. This is the upper level of programming for the auxiliary processor 16 where instructions are executed out of the program memory 890 which contains both instructions and data. The foregoing is all under control of the instruction set for the auxiliary processor 16 which is defined by the words in nanostore 956 which provide the control signals P to the various components of the auxiliary processor 16 as indicated in FIG. 13. This is the lower level of programming for auxiliary processor 16 where the instruction set is defined by providing a mapping from the op codes of words in nanostore 956 to the various function and control lines necessary to sequence the microprocessor slice 880.

Figure 14:
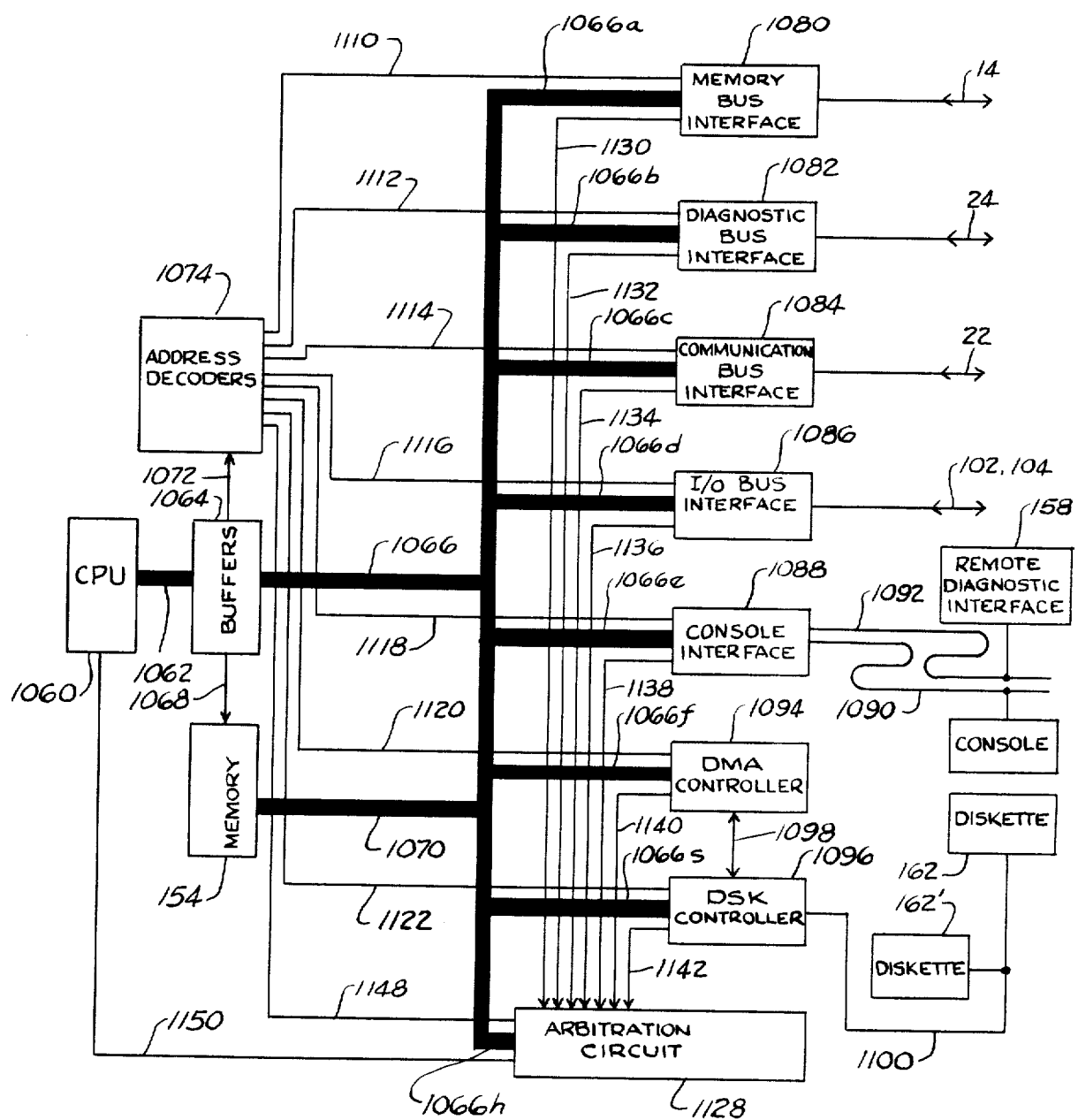
FIG. 14 is a schematic block diagram further illustrating the supervisory processor of the system of FIG. 1.

FIG. 14 illustrates in further detail the supervisory processor 20 shown in FIGS. 1 and 5. The supervisory store designated 154 in FIG. 5 also is shown in the arrangement of FIG. 14 and is a 64K bit plus parity memory. The memory 154 stores instructions and data for such operations as initializing, configuring and diagnosing the system. The remote diagnostic interface 158 and diskette device 162 shown in FIG. 5 also are included in FIG. 14. The remainder of the arrangement of FIG. 14 is the supervisory and diagnostic processing unit designated 156 in FIG. 5. It includes a central processing unit 1060 which fetches, decodes and executes instructions associated with operation of the supervisory processor. By way of example, unit 1060 can be a microprocessor commercially available from Zilog, Inc. under the description Z80A-CPU. The unit 1060 is connected through a bidirectional bus 1062 to buffers 1064 which, in turn, are connected to another bidirectional bus 1066 which leads through bus branches 1066a-g to various interfaces which will be described. Buffers 1064 send timing and control signals from the central processing unit 1060 to memory 154 over path 1068. Memory 154 is connected by a bidirectional bus branch 1070 to bus 1066 for transmission of data and address quantities to and from memory 154. Address quantities on bus 1062 are transmitted by a path 1072 from buffers 1064 to an input-output address decoder 1074. Decoder 1074 functions to select the particular interface which is to be operative at any given point in time.

Turning now to the various interface units, there is a memory bus interface 1080 which will be described in detail presently which is operatively connected between bus branch 1066a and the main store bus 14. There is a diagnostic bus interface 1082 operatively connected between bus branch 1066a and the diagnostic bus 24, a communication bus interface 1084 connected between the bus branch 1066c and the communication bus 22, and an input-output bus interface 1086 operatively connected between the bus branch 1066d and the input-output bus combination designated 102,104 in FIG. 5. The interface units 1082, 1084 and 1086 are based on programmable interface controllers commercially available from Zilog, Inc. under the designation Z80A-PIO. A console interface is operatively connected between the bus branch 1066e and dual serial channels designated 1090,1092. By way of example, interface unit 1088 can be a programmable dual channel device commercially available from Zilog, Inc. under the designation Z80A-SIO. A supervisory processor -DMA interface controller 1095 is connected to the bus branch 1066f. By way of example, interface unit 1094 can be a programmable, single channel device commercially available from Zilog, Inc. under the designation Z80A-DMA. A floppy disk interface controller 1096 is connected to the bus branch 1066g. By way of example, interface unit 1096 can be a programmable floppy disk controller commercially available from Intel under model No. 8271. A bidirectional path 1098 connects the interface units 1094 and 1096 together. A cable 110 connects the floppy disk controller 1096 to appropriate drives. Diskette devices 162,162' also shown in FIG. 5 are connected to cable 1100. A multiple number of diskette devices can be used, for example up to eight.

As shown in FIG. 14, lines 1110, 1112, 1114,1116, 1118, 1120 and 1122 connect outputs of the decoder circuit 1074 to the interface units 1080, 1082, 1084, 1086, 1088, 1094 and 1096, respectively. Thus, a word received by decoder 1074 is decoded to a signal on one or more of these lines for selecting one or more interface units which are to be active at a particular point in time.

The arrangement of FIG. 14 further includes an atbitration circuit 1128 connected to another bus branch 1066h and to lines 1130, 1132, 1134, 1136, 1138, 1140 and 1142 from the interface units 1080, 1082, 1084, 1086, 1088, 1094 and 1096, respectively. These lines transmit service requests from the corresponding interface units and the circuit 1128 determines in what order the requests are to be honored. An output of decoder 1074 is transmitted by line 1148 to arbitration circuit 1128. The output of circuit 1128, indicating a request is pending, is transmitted by line 1150 to the processor 1060.

Figure 15:
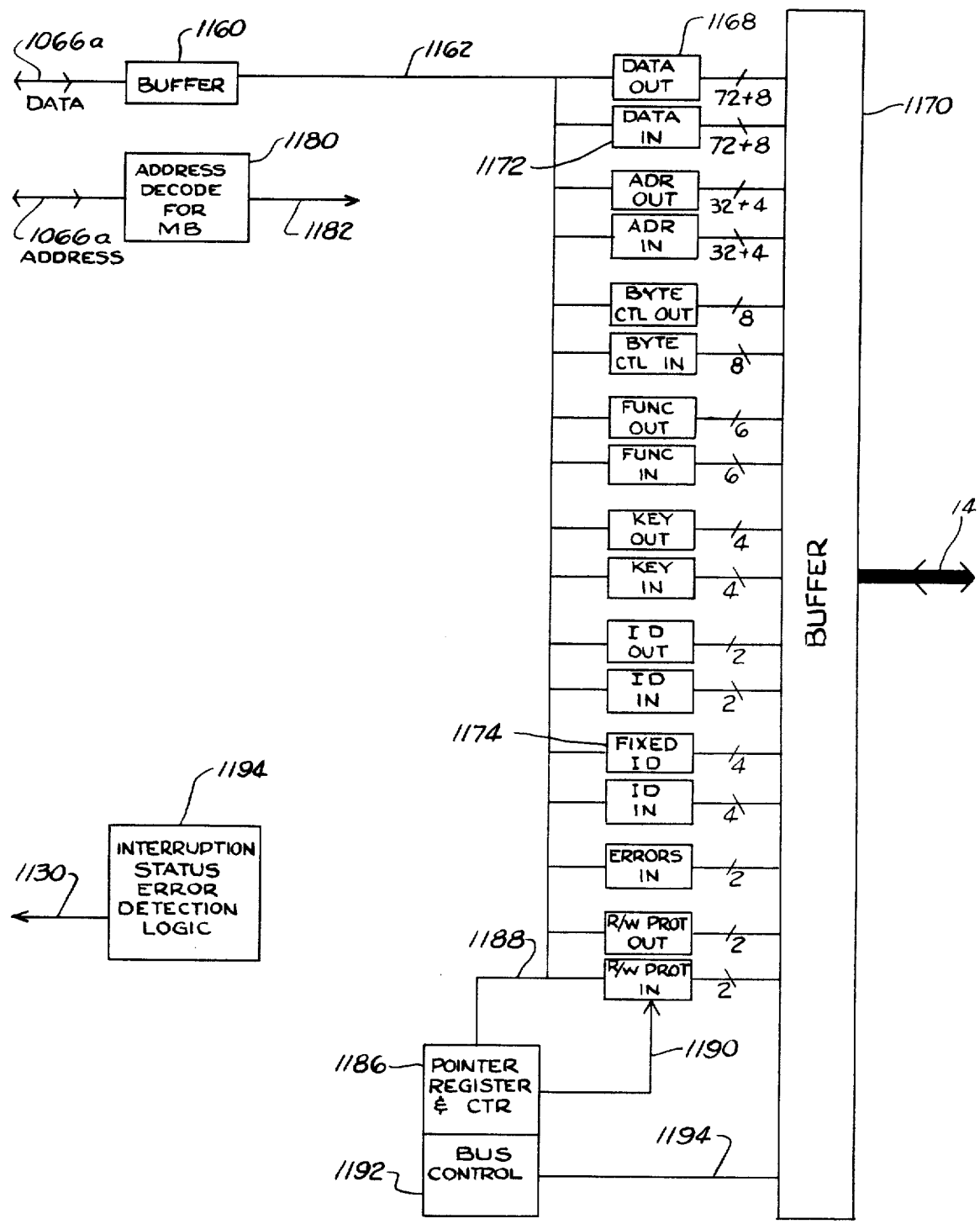
FIG. 15 is a schematic block diagram of the main store bus interface of the supervisory processor shown in FIG. 14.

FIG. 15 illustrates in further detail the memory bus interface 1080 of the arrangement of FIG. 14. The bus branch 1066a shown in FIG. 14 has data and address portions designated 1066a (Data) and 1066a (Address), respectively, in FIG. 15. The data portion of the bus is connected to a buffer 1160 which, in turn, is connected to a bus 1162 which is an extension of the bus branch portion 1066a(Data). Bus 1162 is divided into a plurality of branches leading to components for separating the data bits conveyed by bus 1162 on an operational or functional basis. For example, one branch of bus 1162 is connected to a component 1168 through which 72 bits plus 8 parity bits are transmitted through buffers 1170 to the main store bus 14. Similarly, 72 bits plus 8 parity bits received from the main store bus 14 are received through component 1172 and returned through a branch bus to the bus 1162. The foregoing operation occurs in a similar manner for the other components between bus 1162 and buffers 1170 which, for convenience, are labeled according to function in FIG. 15 with the bit size of the paths between the components and buffers 1170 being indicated by the numbers alongside the paths in FIG. 15. The component 1174 labeled "fixed ID" is not connected to bus 1162 and includes switches for providing the indicated function.

The bus portion 1066A(Address) is connected to the input of an address decoder 1180, the output of which is connected by a plurality of control lines, collectively designated 1182, to each of the components associated with buffers 1170. By virtue of this arrangement, both the component and the direction of data flow are selected. A pointer register and counter 1186 is connected through paths 1188 and 1190 to the components as shown in FIG. 15. A bus control logic circuit 1192 is connected by path 1194 to the buffers 1170 for providing arbitration for the transfer to and from main store bus 14. The interface finally comprises a logic circuit 1196 for providing signals indicative of interrupts status and error conditions which are sent by line 1130 to the arbitration circuit 1128 shown in FIG. 14.

It is therefore apparent that the present invention accomplishes its intended objects. While an embodiment of the present invention has been described in detail, this is for the purpose of illustration, not limitation.

We claim:

1. A data processing system comprising:
   (a) a plurality of execution processors, each functioning to fetch, decode and execute instructions;
   (b) a plurality of auxiliary processors, each functioning to provide services not performed by said execution processors including systems support, input-output processing and special instruction support;
   (c) a supervisory processor for initiating, configuring and monitoring said system;
   (d) communication means common to all of said processors for connecting all of said processors in said system in a manner such that any processor can identify any other processor and thereby communicate with any other processor at high speed commensurate with the single instruction speed of any one processor in order to transfer control information and data associated with the control information through said system;
   (e) said communication means being separate from the memory of said system and connecting said processors in a tightly coupled manner with all of said processors sharing a common memory space;
   (f) said communication means connecting said processors in a manner such that said execution processors are capable of being different from one another and nonhomogeneous and said auxiliary processors are capable of being different from one another and nonhomogeneous; and
   (g) whereby data, control, and diagnostic information can be transferred simultaneously through said system.

2. A data processing system according to claim 1, further including diagnostic bus means for connecting said supervisory processor to all of said processors in said system.

3. A data processing system according to claim 1, further including:
   (a) main storage means; and
   (b) main store bus means operatively connected to said main storage means and to said processors for enabling said processors to share said main storage means.

4. A data processing system according to claim 1, further including:
   (a) an intelligent main store including main memory means and main memory control means operatively connected to said main memory means for accessing said main memory means in a manner allowing different address and data structures; and
   (b) means for connecting said processors to said intelligent main store enabling said processors to share said memory.

5. A data processing system according to claim 1, further including:
   (a) a bus arrangement comprising a plurality of additional buses;
   (b) means for connecting said auxiliary processors in controlling relation to said bus arrangement; and
   (c) said auxiliary processors comprising one category of processors and said execution processors comprising another category of processors;
   (d) whereby each of said two categories of processors is capable of using the other of said two categories of processors as a pool.

6. A data processing system comprising:
   (a) a plurality of processors;
   (b) a communication bus for connecting all of said processors together;
   (c) a bus arrangement comprising a plurality of additional buses;
   (d) means for connecting any processor of a sub-set of said plurality of processors in controlling relation to said bus arrangement whereby any processor of said sub-set can control said bus arrangement, said sub-set dividing the plurality of processors into two groups of processors;
   (e) each group of said processors being capable of using the other group of processors as a pool so that whatever function is performed by said other groups of processors can be assigned to a processor of said other group whose identity is not known to the assigning group of processors; and
   (f) each individual processor of said plurality of processors being capable of communicating with each other individual processor through said communication bus, the message of said communication bus containing source identification bits and destination identification bits and each processor recognizing one or more of said identification bits, one of said bits being that processor's own identification bit and the other of said bits being a pool identification.

7. A data processing system according to claim 6, wherein said processors of each of said two groups are capable of being different.

8. A data processing system according to claim 6, further including:
   (a) a supervisory processor for initiating, configuring and monitoring said system;
   (b) diagnostic bus means for connecting said supervisory processor to all of said processors in said system; and
   (c) means for connecting said supervisory processor in controlling relation to said bus arrangement.

9. A data processing system comprising:
   (a) a plurality of tightly coupled processors;
   (b) main storage means separate from said processors;
   (c) main store bus means operatively connected to main storage means and to said processors for enabling said processors to share said main storage means;
   (d) communication bus means separate from said main store bus means for connecting all of said processors together in a tightly coupled manner with all of said processors sharing a common memory space and in a manner such that any processor can identify any other processor and thereby communicate with any other processor at high speed commensurate with the single instruction speed of any one processor in order to transfer control information and data associated with the control information through said system;
   (e) a supervisory processor; and
   (f) diagnostic bus means separate from said main store bus means and said communication bus means connected to and controlled by said supervisory processor for connecting said supervisory processor to all of said processors in said system for initiating, configuring and monitoring said system through said diagnostic bus means.

10. A data processing system according to claim 9, wherein said diagnostic bus means is operatively connected to said main storage means.

11. A data processing system according to claim 9, wherein said plurality of processors are arranged in at least two groups, said system further comprising:
    (a) a bus arrangement comprising a plurality of additional buses; and
    (b) means for connecting one of said two groups of processors in controlling relation to said bus arrangement.

12. A data processing system according to claim 11 further including means for connecting said supervisory processor in controlling relation to said bus arrangement.

13. A data processing system according to claim 12 further including means for connecting said supervisory processor to said communication bus means.

14. A data processing system comprising:
    (a) main storage means;
    (b) main storage bus means connected to said main storage means;
    (c) a supervisory processor connected to said main storage bus means;
    (d) at least one other processor, said other processor being connected to said main storage bus means, said other processor having its own storage means so that it does not use said main storage means as a programmed storage;
    (e) communication bus means separate from said main store bus means connected to said supervisory processor and to said other processor;
    (f) diagnostic bus means separate from said main store bus means and from said communication bus means connected in controlled relation to said supervisory processor for connecting said supervisory processor to said other processor in said system for initiating, configuring and monitoring said system through said diagnostic bus means; and
    (g) an input-output bus ensemble connected to said supervisory processor and to said other processor, said other processor capable of being limited to providing transfer of information between said input-output bus ensemble and said main storage means;
    (h) whereby said system has the capability of including additional ones of said other processors, said additional processors being of the same or of different types.

15. A data processing system comprising:
    (a) an intelligent main store including main memory means, main memory control means connected to said main memory means for accessing said memory means and function means connected to said control means for providing memory management functions;
    (b) main storage bus means connected to said main store;
    (c) at least one execution processor connected to said main storage bus means for fetching, decoding and executing instructions;
    (d) at least one auxiliary processor connected to said main storage bus means for providing services not performed by said execution processor including systems support, input-output processing and special instruction support;
    (e) a supervisory processor connected to said main storage bus means;
    (f) communication bus means connected to said auxiliary and execution processors and to said supervisory processor;
    (g) diagnostic bus means connected in controlled relation to said supervisory processor for connecting said supervisory processor to each of said auxiliary and execution processors for initiating, configuring and monitoring said system through said diagnostic bus means;
    (h) an input-output bus ensemble comprising an arrangement of a plurality of input-output buses connected to said supervisory processor and to said auxiliary processor, said auxiliary processor capable of being limited to providing transfer of information between said input-output bus ensemble and said main store means, and said execution processor capable of being limited to providing computational functions not involving information transfer from said input-output bus ensemble; and
    (i) at least one direct memory access controller connected to said main storage bus means and to said input-output bus ensemble.

16. A data processing system according to claim 15, further including a plurality of said auxiliary processors, each being operatively connected to said main storage bus means, to said communication bus means, to said diagnostic bus means and to said input-output bus ensemble.

17. A data processing system according to claim 16, further including a corresponding plurality of said direct memory access controllers each operatively connected to said main storage bus means and to said input-output ensemble.

18. A data processing system according to claim 15, further including a plurality of said execution processors, each being operatively connected to said main storage bus means, to said communication bus means and to said diagnostic bus means.

19. A data processing system according to claim 18, wherein said execution processors are different from one another.

* * * * *